(12) United States Patent
Okanishi et al.

(10) Patent No.: US 10,326,148 B2
(45) Date of Patent: Jun. 18, 2019

(54) FUEL CELL GAS DIFFUSION LAYER AND METHOD OF MANUFACTURING SAME

(71) Applicant: PANASONIC CORPORATION, Osaka (JP)

(72) Inventors: Takeou Okanishi, Nara (JP); Hiroshi Ishikawa, Osaka (JP); Keiichi Yamamoto, Osaka (JP); Tsutomu Kawashima, Nara (JP); Yasushi Sugawara, Osaka (JP); Yoichiro Tsuji, Osaka (JP); Norihisa Yoshimoto, Osaka (JP); Miyuki Yoshimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 818 days.

(21) Appl. No.: 14/365,463

(22) PCT Filed: Oct. 18, 2013

(86) PCT No.: PCT/JP2013/006187
§ 371 (c)(1),
(2) Date: Jun. 13, 2014

(87) PCT Pub. No.: WO2014/061280
PCT Pub. Date: Apr. 24, 2014

(65) Prior Publication Data
US 2014/0329167 A1    Nov. 6, 2014

(30) Foreign Application Priority Data

Oct. 19, 2012  (JP) .................................. 2012-231325
Oct. 19, 2012  (JP) .................................. 2012-231326
(Continued)

(51) Int. Cl.
*H01M 8/02* (2016.01)
*H01M 8/0234* (2016.01)
(Continued)

(52) U.S. Cl.
CPC ....... *H01M 8/0234* (2013.01); *H01M 8/0239* (2013.01); *H01M 8/0243* (2013.01);
(Continued)

(58) Field of Classification Search
CPC ........ H01M 8/023–8/0247; H01M 2008/1095; H01M 8/0234; H01M 8/0239; H01M 8/0245; H01M 8/0243; Y02P 70/56
See application file for complete search history.

(56) References Cited

U.S. PATENT DOCUMENTS 5,618,392 A    4/1997  Furuya
2005/0173244 A1    8/2005  Hayashi et al.
(Continued)

FOREIGN PATENT DOCUMENTS

JP    03-182052 A    8/1991
JP    08-111226 A    4/1996
(Continued)

OTHER PUBLICATIONS

Manahan, M. P., et al. "Laser perforated fuel cell diffusion media. Part I: Related changes in performance and water content." Journal of Power Sources 196.13 (2011): 5573-5582.*
(Continued)

*Primary Examiner* — Milton I Cano
*Assistant Examiner* — Philip A. Stuckey
(74) *Attorney, Agent, or Firm* — McDermott Will & Emery LLP

(57) ABSTRACT

A fuel cell gas diffusion layer includes a porous member containing electrically-conductive particles and polymeric
(Continued)

resin as major components, and a plurality of holes extending from a main surface of the fuel cell gas diffusion layer are formed.

4 Claims, 18 Drawing Sheets

(30) Foreign Application Priority Data

Oct. 19, 2012 (JP) .................................. 2012-231328
Oct. 19, 2012 (JP) .................................. 2012-231329

(51) Int. Cl.
*H01M 8/0239* (2016.01)
*H01M 8/0243* (2016.01)
*H01M 8/0245* (2016.01)
*H01M 8/1018* (2016.01)

(52) U.S. Cl.
CPC .............................. *H01M 8/0245* (2013.01);
*H01M 2008/1095* (2013.01); *Y02P 70/56* (2015.11)

(56) References Cited

U.S. PATENT DOCUMENTS

| | | | |
|---|---|---|---|
| 2007/0099068 A1 | 5/2007 | Suzuki et al. | |
| 2008/0241635 A1 | 10/2008 | Sato et al. | |
| 2008/0299430 A1 | 12/2008 | Ichikawa et al. | |
| 2010/0227244 A1* | 9/2010 | Song | H01M 4/8605 429/468 |
| 2011/0076592 A1 | 3/2011 | Yamauchi et al. | |
| 2011/0207025 A1 | 8/2011 | Yamauchi et al. | |

FOREIGN PATENT DOCUMENTS

| | | |
|---|---|---|
| JP | 2005-038738 A | 2/2005 |
| JP | 2007-242306 A | 9/2007 |
| JP | 2007-311269 A | 11/2007 |
| JP | 4186762 B2 | 9/2008 |
| JP | 2008-277093 A | 11/2008 |
| JP | 2010-129310 A | 6/2010 |

OTHER PUBLICATIONS

International Search Report issued in International Application No. PCT/JP2013/006187 dated Jan. 21, 2014.
Extended European Search Report issued in corresponding European Patent Application No. 13847149.5, dated Aug. 4, 2015.

\* cited by examiner

FUEL CELL GAS DIFFUSION LAYER AND METHOD OF MANUFACTURING SAME

RELATED APPLICATIONS

This application is the U.S. National Phase under 35 U.S.C. § 371 of International Application No. PCT/JP2013/006187, filed on Oct. 18, 2013, which in turn claims the benefit of Japanese Application No. 2012-231325, filed on Oct. 19, 2012, Japanese Application No. 2012-231326, filed on Oct. 19, 2012, Japanese Application No. 2012-231329, filed on Oct. 19, 2012, and Japanese Application No. 2012-231328, filed on Oct. 19, 2012, the disclosures of which are incorporated by reference herein.

TECHNICAL FIELD

The present invention relates to a fuel cell gas diffusion layer and a method of manufacturing the fuel cell gas diffusion layer. More specifically, the present invention relates to a fuel cell gas diffusion layer including a porous member containing electrically-conductive particles and polymeric resin as major components and a method of manufacturing the fuel cell gas diffusion layer.

BACKGROUND ART

As a diffusion membrane used when manufacturing a diffusion layer member constituting an electrode of a fuel cell, an electric double layer capacitor, or the like, PTL 1 discloses a diffusion membrane containing unbaked polytetrafluoroethylene, baked polytetrafluoroethylene, and electrically-conductive substances.

PTL 2 discloses a fuel cell gas diffusion layer that is a gas diffusion layer used in a fuel cell and includes a porous member containing electrically-conductive particles and polymeric resin as major components. PTL 2 describes that the fuel cell including the gas diffusion layer operates in such a manner that: a gas humidification dew point of an anode is 65° C.; a gas humidification dew point of a cathode is 35° C.; and a cell temperature is 90° C. (paragraph 0084).

CITATION LIST

Patent Literature

PTL 1: Japanese Laid-Open Patent Application Publication No. 2003-187809
PTL 2: International Publication No. 2010/050219

SUMMARY OF INVENTION

Technical Problem

Further improvement of an electric power generation performance of the fuel cell has been required in a case where the conventional gas diffusion layer including the porous member containing the electrically-conductive particles and the polymeric resin as the major components is used in the fuel cell.

The present invention was made to solve the above problem, and one example of an object of the present invention is to further improve the electric power generation performance of a fuel cell in a case where a gas diffusion layer including a porous member containing electrically-conductive particles and polymeric resin as major components is used in the fuel cell.

Solution to Problem

A fuel cell gas diffusion layer according to one aspect of the present invention includes a porous member containing electrically-conductive particles and polymeric resin as major components, wherein a plurality of holes extending from a main surface of the fuel cell gas diffusion layer are formed.

A method of manufacturing a fuel cell gas diffusion layer according to one aspect of the present invention includes: kneading electrically-conductive particles, polymeric resin, a surfactant, and a dispersion solvent to obtain a homogeneous kneaded matter; rolling out and shaping the kneaded matter to obtain a sheet-shaped kneaded matter; subjecting the sheet-shaped kneaded matter to a heat treatment at a first heat treatment temperature to obtain a first layer formed by removing the surfactant and the dispersion solvent from the sheet-shaped kneaded matter; and forming a plurality of holes on the first layer, the plurality of holes penetrating the first layer.

Advantageous Effects of Invention

The fuel cell gas diffusion layer of the present invention can further improve the electric power generation performance in a case where the gas diffusion layer including the porous member containing the electrically-conductive particles and the polymeric resin as the major components is used in the fuel cell.

DESCRIPTION OF EMBODIMENTS

Figure 1:
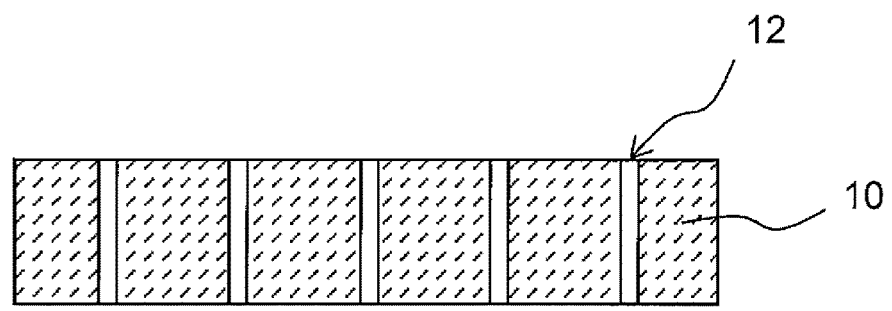
FIG. 1 is a cross-sectional view showing one example of a schematic configuration of a gas diffusion layer according to Embodiment 1.

To solve the above problem, the present inventors have diligently studied, and as a result, obtained the following findings.

An air permeance of a gas diffusion layer including a porous member containing electrically-conductive particles and polymeric resin as major components is lower than that of a gas diffusion layer including a base material, such as carbon paper. Therefore, moisture generated at a catalyst layer (electrode) is less likely to diffuse through the gas diffusion layer, so that an electrolyte membrane and the catalyst layer are less likely to be dried. Therefore, it was found that the gas diffusion layer including the porous member containing the electrically-conductive particles and the polymeric resin as the major components is suitable for a so-called low humidification operation that is an operation performed in a state where the dew point of a gas to be supplied to the electrode is made lower than the temperature of the fuel cell. The low humidification operation is preferable in that a humidifier becomes unnecessary or can be reduced in size.

As above, since the air permeance of the gas diffusion layer including the porous member containing the electrically-conductive particles and the polymeric resin as the major components is low, and the electrolyte membrane is less likely to be dried, the gas diffusion layer has been developed on the assumption that it is used in the low humidification operation. However, the present inventors have found that there are some cases where the gas diffusion layer deforms when the fuel cell including the gas diffusion layer repeatedly operates under severe conditions, such as start-up and stop. The present inventors have studied the reasons for this, and as a result, found that the gas diffusion layer tends to deform especially when, for example, the fuel cell is started up in a state where the temperature of the fuel cell is low, that is, about a room temperature. It was concluded that the reasons for this is as below.

To be specific, in a cathode-side catalyst layer of the fuel cell, a chemical reaction between protons having passed through a polymer electrolyte membrane from an anode side to reach the cathode-side catalyst layer and oxygen supplied through a cathode-side gas diffusion layer to the cathode-side catalyst layer occurs. This reaction generates so-called mist, that is, fine particles each formed by binding a plurality of water molecules. The mist diffuses to move from the catalyst layer to the gas diffusion layer. When the temperature of the fuel cell is low, a kinetic energy of the mist is low. Therefore, a part of the mist adheres to the gas diffusion layer at a boundary between the catalyst layer and the gas diffusion layer. On the adhered mist as a core, the mist aggregates one after another. As a result, a region where liquid water accumulates is locally generated at the boundary between the catalyst layer and the gas diffusion layer. The region where the water accumulates generates water pressure, and this water pressure pushes up the gas diffusion layer. Thus, the gas diffusion layer is separated from the catalyst layer to deform. If this deformation proceeds, there may be a case where the gas diffusion layer breaks, and the catalyst layer is exposed to a gas channel, so that the drying and deterioration of the electrolyte membrane are accelerated.

To be specific, it has been thought that in a case when the gas diffusion layer including the porous member containing the electrically-conductive particles and the polymeric resin as the major components is used in the fuel cell, the low humidification operation is performed, so that the water excess does not occur in the fuel cell, and therefore, it is unnecessary to consider the discharge of the water generated at the boundary between the catalyst layer and the gas diffusion layer. However, the present inventors have studied and found that even in a case where the low humidification operation is performed, the water generated at the boundary between the catalyst layer and the gas diffusion layer causes problems, such as the deformation of the gas diffusion layer, if, for example, the temperature of the fuel cell is low, that is, about the room temperature at the time of the start-up. This finding is not conventionally known, that is, new.

Based on the discovery of this new problem, the present inventors have further studied. As a result, the present inventors have found that it is possible to reduce the possibility of the deformation of the gas diffusion layer by forming a plurality of holes on the gas diffusion layer including the porous member containing the electrically-conductive particles and the polymeric resin as the major components, the plurality of holes extending from a main surface of the gas diffusion layer.

The holes may be holes extending in a thickness direction of the gas diffusion layer. The holes may be holes extending in a direction perpendicular to the main surface of the gas diffusion layer. The holes may be holes extending in a direction oblique to the main surface of the gas diffusion layer. The holes may penetrate the gas diffusion layer. The holes do not have to penetrate the gas diffusion layer. The discharge of the water from the boundary between the gas diffusion layer and the catalyst layer is accelerated by the holes. Therefore, for example, a portion where liquid water accumulates is less likely to be formed at the boundary between the gas diffusion layer and the catalyst layer, and the gas easily diffuses uniformly. Thus, the electric power generation performance of the fuel cell improves.

Hereinafter, embodiments of the present invention will be explained in reference to the drawings.

Embodiment 1

A fuel cell gas diffusion layer of Embodiment 1 includes a porous member containing electrically-conductive particles and polymeric resin as major components, and a plurality of holes extending from a main surface of the fuel cell gas diffusion layer are formed.

The "porous member containing electrically-conductive particles and polymeric resin as major components" denotes a porous member that does not contain carbon fiber as a base material and has a structure (so-called self-supporting body structure) constituted only by the electrically-conductive particles and the polymeric resin. In the case of manufacturing the porous member by using the electrically-conductive particles and the polymeric resin, for example, a surfactant and a dispersion solvent are used as described below. In this case, the surfactant and the dispersion solvent are removed by firing during a manufacturing process. However, the surfactant and the dispersion solvent may not be removed adequately and remain in the porous member. Therefore, the "porous member containing electrically-conductive particles and polymeric resin as major components" may contain the residual surfactant and the residual dispersion solvent as long as it has the structure constituted only by the electrically-conductive particles and the polymeric resin. In addition, as long as the object of the present invention can be achieved, the porous member may contain materials (for example, short carbon fiber) other than the electrically-conductive particles, the polymeric resin, the surfactant, and the dispersion solvent.

A channel may be formed on the fuel cell gas diffusion layer. To be specific, projections and depressions, such as channels, may be formed on one of two main surfaces of the fuel cell gas diffusion layer, the one main surface being opposite to a main surface located at the catalyst layer side.

The "porous member" is a member having an ability to allow gases (such as a fuel gas and an oxidizing gas) to permeate therethrough to such a degree that the gas diffusion layer constituted by the member can be used in the fuel cell.

The fuel cell gas diffusion layer may comprise a matrix in which the electrically-conductive particles and the polymeric resin are homogeneously dispersed in a surface direction. The "surface direction" denotes a direction in which the gas diffusion layer extends. The phrase "homogeneously dispersed in a surface direction" denotes a state where the electrically-conductive particles and the polymeric resin are practically homogeneously distributed in the surface direction. The electrically-conductive particles and the polymeric resin may be or may not be homogeneously dispersed in the thickness direction. To be specific, a plurality of layers stacked in the thickness direction may be formed, and in each of the layers, the electrically-conductive particles and the polymeric resin may be practically homogeneously distributed in the surface direction, but the densities, compositions, and the like of the layers may be different from one another. For example, this indicates a case where the electrically-conductive particles and the polymeric resin are kneaded to be shaped, but a manufacturing method is not especially limited. More specifically, for example, this indicates a case where the carbon fiber is not contained as the base material. Or, for example, this indicates a case where the carbon fiber is not contained as the base material, and the electrically-conductive particles and the polymeric resin are contained as the major components. Or, for example, this indicates a case where the carbon fiber is not contained as the base material, and the gas diffusion layer has the structure constituted by the electrically-conductive particles and the polymeric resin. Regarding these points, the same is true for the other embodiments.

In the above fuel cell gas diffusion layer, the holes may be formed so as to penetrate the fuel cell gas diffusion layer.

A method of manufacturing a fuel cell gas diffusion layer according to Embodiment 1 includes: kneading electrically-conductive particles, polymeric resin, a surfactant, and a dispersion solvent to obtain a homogeneous kneaded matter; rolling out and shaping the kneaded matter to obtain a sheet-shaped kneaded matter; subjecting the sheet-shaped kneaded matter to a heat treatment at a first heat treatment temperature to obtain a first layer formed by removing the surfactant and the dispersion solvent from the sheet-shaped kneaded matter; and forming a plurality of holes on the first layer, the plurality of holes penetrating the first layer.

Device Configuration

FIG. 1 is a cross-sectional view showing one example of a schematic configuration of the gas diffusion layer according to Embodiment 1. Hereinafter, a gas diffusion layer 100 of Embodiment 1 will be explained in reference to FIG. 1.

As shown in FIG. 1, the gas diffusion layer 100 includes a first layer 10. Embodiment 1 explains a case where the gas diffusion layer is constituted by a single layer.

The first layer 10 includes the porous member containing the electrically-conductive particles and the polymeric resin as the major components. A plurality of holes 12 extending from the main surface of the fuel cell gas diffusion layer 100 are formed on the first layer 10. The holes 12 are formed so as to penetrate the first layer 10.

The first layer 10 may be constituted by the matrix in which the electrically-conductive particles and the polymeric resin are homogeneously dispersed in the surface direction of the gas diffusion layer 100.

The gas diffusion layer 100 may be formed as, for example, a gas diffusion layer (so-called base material less GDL) that does not contain the carbon fiber or the like as the base material.

The shape of the hole 12, the number of holes 12, the size of the hole 12, the arrangement of the holes 12, and the like are not especially limited. Each of the holes 12 may have a substantially linear shape (a tubular shape whose diameter is constant). The holes 12 are formed so as to penetrate the first layer 10. To be specific, in the present embodiment, the holes 12 are through holes penetrating the first layer 10.

The shape of an opening portion of each of the holes 12 may be a circle, an oval, a triangle, a square, or the like. For example, the hole 12 may obliquely penetrate the first layer 10. For example, the hole 12 may be formed such that the opening portion thereof on one of surfaces of the first layer 10 is larger than the opening portion thereof on the other surface of the first layer 10. For example, the hole 12 may have a tapered shape.

For example, a longest part of the opening portion of the hole 12 may be not shorter than 30 μm and not longer than 500 μm, may be not shorter than 50 μm and not longer than 250 μm, or may be not shorter than 100 μm and not longer than 230 μm.

In a case where the opening portion of the hole 12 has a substantially circular shape, for example, the diameter thereof may be not shorter than 30 μm and not longer than 500 μm, may be not shorter than 50 μm and not longer than 250 μm, or may be not shorter than 100 μm and not longer than 230 μm.

By setting the total of the areas of the opening portions of the holes 12 to 5% or less of the area of the first layer 10, the moisture retaining property and strength of the gas diffusion layer 100 can be made preferable. By setting the total of the areas of the opening portions of the holes 12 to 1% or less of the area of the first layer 10, the moisture retaining property and strength of the gas diffusion layer 100 can be made further preferable. The area of the first layer 10 denotes the area of the main surface of the first layer 10.

For example, the holes 12 may be distributed in a grid alignment in which cycles of adjacent rows of the holes 12 coincide with each other or may be distributed in a zig-zag alignment in which the cycles of the adjacent rows of the holes 12 are displaced from each other by a half cycle. The holes 12 do not have to be formed on the entire surface of the first layer 10 and may be formed on a part of the main surface of the first layer 10. An arrangement direction of the holes 12 does not have to be parallel or perpendicular to the gas channel. For example, a distance between the adjacent holes 12 (distance between the centers of the holes 12) may be not shorter than 0.3 mm and not longer than 10 mm, may be not shorter than 0.5 mm and not longer than 5 mm, or may be not shorter than 1 mm and not longer than 3 mm.

A method of forming the holes 12 is not especially limited. Specifically, for example, the holes 12 may be formed by inserting a needle made of metal or the like. Or, for example, the holes 12 may be formed by using a laser, such as a UV laser or a $CO_2$ laser. Or, for example, the holes 12 may be formed by using a mold that is used to shape the first layer 10 and provided with penetrating members and by pouring the materials into the mold. To be specific, the holes 12 may be formed simultaneously with the formation of the first layer 10 or may be formed after the formation of the first layer 10.

For example, the thickness of the first layer 10 may be not less than 100 μm and not more than 1,000 μm. In a case where the thickness of the first layer 10 is not less than 100 μm, mechanical strength of the first layer 10 increases. In a case where the thickness of the first layer 10 is not more than 1,000 μm, electrical resistance of the first layer 10 decreases.

For example, carbon fine powder can be used as the electrically-conductive particles. Examples of the carbon fine powder include carbon materials, such as graphite, carbon black, activated carbon, and carbon fiber fine powder. Examples of the carbon black include acetylene black (AB), furnace black, ketjen black, and vulcan. Examples of the carbon fiber fine powder include vapor grown carbon fiber (VGCF), milled fiber, cut fiber, and chop fiber. As the electrically-conductive particles, these materials may be used alone or in combination. The form of the carbon material may be any form, such as a powder form, a fibrous form, or a particle form.

By mixing the carbon black and the carbon fiber, the manufacturing cost, electrical conductivity, and strength of the gas diffusion layer can be improved. Further, by using the acetylene black as the carbon black, the impurity content of the gas diffusion layer can be reduced, and the electrical conductivity of the gas diffusion layer can be further improved.

For example, fluorocarbon resin can be used as the polymeric resin. Examples of the fluorocarbon resin include PTFE (polytetrafluoroethylene), PEP (tetrafluoroethylene hexafluoropropylene copolymer), PVDF (polyvinylidene fluoride), ME (tetrafluoroethylene ethylene copolymer), PCTFE (polychlorotrifluoroethylene), and PFA (tetrafluoroethylene perfluoro alkyl vinyl ether copolymer).

By using the PTFE as the fluorocarbon resin, the heat resistance, water repellency, and chemical resistance of the gas diffusion layer can be improved. Examples of the form of the PTFE include a dispersion form and a powder form. By using the dispersion, the work efficiency can be improved.

The polymeric resin may serve as a binder that binds the electrically-conductive particles to each other. In a case where the content of the polymeric resin in the first layer 10 is 5 wt % or more, the polymeric resin effectively serves as the binder. To uniformize the thickness of the first layer 10, a roll-out process may be adopted. In a case where the content of the polymeric resin in the first layer 10 is 50 wt % or less, conditions at the time of the roll-out process can be simplified. In a case where the content of the polymeric resin in the first layer 10 is 30 wt % or less, the conditions at the time of the roll-out process can be further simplified.

An air resistance of the first layer 10 on which the holes 12 are not yet formed may be 100 seconds or more. The air resistance is a time required for a specified volume (100 mL) of air to flow through the first layer 10 per unit area and unit pressure difference. In the present specification, the air resistance is obtained by Gurley method based on JIS-P8177:2009. JIS-P8177:2009 is the same as ISO5636-5: 2003 except that an applicable air resistance range is not limited. In the above standard, a B type device is used, and the measurement is started when the indicator has passed an initial 50 ml marked line.

The first layer 10 may be the porous member containing the electrically-conductive particles and the polymeric resin as the major components. The first layer 10 may include the porous member containing the electrically-conductive particles and the polymeric resin as the major components, the electrically-conductive particles being the carbon fiber, the weight of which is smaller than that of the polymeric resin. The porous member may contain the carbon fiber of not lower than 2.0 wt % and not higher than 7.5 wt %. The porous member may contain the polymeric resin of not lower than 10 wt % and not higher than 17 wt %. The first layer 10 can be configured so as not to contain the base material.

In the present specification, the "porous member containing the electrically-conductive particles and the polymeric resin as the major components" denotes a porous member that does not contain the carbon fiber as the base material and has the structure (so-called self-supporting body structure) constituted only by the electrically-conductive particles and the polymeric resin. In the case of manufacturing the porous member by using the electrically-conductive particles and the polymeric resin, for example, the surfactant and the dispersion solvent are used as described below. In this case, the surfactant and the dispersion solvent are removed by the firing during the manufacturing process. However, the surfactant and the dispersion solvent may not be removed adequately and remain in the porous member. Therefore, the "porous member containing the electrically-conductive particles and the polymeric resin as the major components" may contain the residual surfactant and the residual dispersion solvent as long as it has the structure constituted only by the electrically-conductive particles and the polymeric resin. In addition, as long as the object of the present invention can be achieved, the porous member may contain materials (for example, short carbon fiber) other than the electrically-conductive particles, the polymeric resin, the surfactant, and the dispersion solvent.

Porosity of the first layer 10 may be not lower than 42% and not higher than 60%.

Hereinafter, a method of measuring (calculating) the porosity of the gas diffusion layer in the present specification will be explained. First, an apparent true density of the manufactured gas diffusion layer is calculated from true densities and composition ratios of respective materials constituting the gas diffusion layer. Next, the density of the manufactured gas diffusion layer is calculated by measuring the weight, thickness, and vertical and horizontal sizes of the manufactured gas diffusion layer. Next, the porosity of the gas diffusion layer is calculated by substituting the obtained density and apparent true density of the gas diffusion layer into a formula "Porosity=(Density of Gas Diffusion Layer)/(Apparent True Density)*100. Thus, the porosity of the manufactured gas diffusion layer can be measured.

In addition to the polymeric resin and the electrically-conductive particles, the first layer 10 may contain the dispersion solvent, the surfactant, and the like. Examples of the dispersion solvent include water, alcohol (such as methanol and ethanol), and glycol (such as ethylene glycol). Examples of the surfactant include nonionic surfactants (such as polyoxyethylene alkyl ether) and amphoteric ion surfactants (such as alkyl amine oxide).

The content of the dispersion solvent in the first layer 10 and the content of the surfactant in the first layer 10 can be suitably selected based on the types of the electrically-conductive particles and polymeric resin constituting the first layer 10, a compounding ratio of the polymeric resin and the electrically-conductive particles, and the like. Generally, as the content of the dispersion solvent and the content of the surfactant increase, the polymeric resin and the electrically-conductive particles disperse more uniformly. In a case where each of the content of the dispersion solvent and the content of the surfactant is set to a certain content or less, the flowability does not become too high, and the formation of the sheet can be facilitated.

The first layer 10 may contain materials (for example, short carbon fiber) other than the electrically-conductive particles, the polymeric resin, the surfactant, and the dispersion solvent.

The gas diffusion layer 100 may contain layers other than the first layer 10.

The gas diffusion layer 100 may be used as a cathode-side gas diffusion layer or an anode-side gas diffusion layer, or the gas diffusion layers 100 may be used as both the cathode-side gas diffusion layer and the anode-side gas diffusion layer. The water generated by the electric power generating reaction is mainly generated at the cathode side, but the water flows through the electrolyte membrane. Therefore, by suitably selecting the configurations of the channels, the dew points of the gases, and the like, the discharge of the water through the holes 12 can be realized at both the cathode side and the anode side.

The present embodiment may be a membrane-electrode-gas diffusion layer assembly including: an electrolyte membrane; an anode catalyst layer contacting one of main surfaces of the electrolyte membrane; a cathode catalyst layer contacting the other main surface of the electrolyte membrane; an anode-side gas diffusion layer contacting one of main surfaces of the anode catalyst layer, the one main surface being opposite to a main surface located at the electrolyte membrane side; and a cathode-side gas diffusion layer contacting one of main surfaces of the cathode catalyst layer, the one main surface being opposite to a main surface located at the electrolyte membrane side, wherein at least one of the anode-side gas diffusion layer and the cathode-side gas diffusion layer includes a porous member containing electrically-conductive particles and polymeric resin as major components, and a plurality of holes are formed to extend from the main surface of the gas diffusion layer, and the plurality of holes are formed so as to penetrate the gas diffusion layer.

The present embodiment may be a fuel cell including: an electrolyte membrane; an anode catalyst layer contacting one of main surfaces of the electrolyte membrane; a cathode catalyst layer contacting the other main surface of the electrolyte membrane; an anode-side gas diffusion layer contacting one of main surfaces of the anode catalyst layer, the one main surface being opposite to a main surface located at the electrolyte membrane side; and a cathode-side gas diffusion layer contacting one of main surfaces of the cathode catalyst layer, the one main surface being opposite to a main surface located at the electrolyte membrane side, wherein at least one of the anode-side gas diffusion layer and the cathode-side gas diffusion layer includes a porous member containing electrically-conductive particles and polymeric resin as major components, and a plurality of holes are formed to extend from the main surface of the gas diffusion layer, and the plurality of holes are formed so as to penetrate the gas diffusion layer.

The polymer electrolyte membrane may be a polymer membrane having hydrogen ion conductivity. The shape of the polymer electrolyte membrane is not especially limited but may be, for example, a substantially rectangular shape. The material of the polymer electrolyte membrane may be a material that selectively moves hydrogen ions.

Examples of the polymer electrolyte membrane include: fluorinated polymer electrolyte membranes made of perfluoro carbon sulfonic acid (such as Nafion (trademark) produced by DuPont USA, Aciplex (trademark) produced by Asahi Kasei Chemicals Corporation, and Flemion (trademark) produced by Asahi Glass Co., Ltd.); and various hydrocarbon electrolyte membranes.

The catalyst layer may be a layer containing catalysts with respect to an oxidation-reduction reaction of hydrogen or oxygen. The catalyst layer may have electrical conductivity and catalytic activity with respect to the oxidation-reduction reaction of hydrogen and oxygen. The shape of the catalyst layer is not especially limited, but may be, for example, a substantially rectangular shape.

The catalyst layer includes, for example, a porous member containing, as major components, carbon powder that supports platinum group metal catalysts and polymer materials that have proton conductivity. The type of the proton conductive polymer material used in the catalyst layer may be the same as or different from that of the polymer electrolyte membrane.

The gas diffusion layer 100 is suitably used in the low humidification operation but may be used in a high humidification operation. To be specific, a fuel cell system including the gas diffusion layer 100 may be provided with or may not be provided with a humidifier configured to humidify the gases to be supplied to the fuel cell.

Since the first layer 10 includes the porous member containing the electrically-conductive particles and the polymeric resin as the major components, the air resistance of a part of the first layer 10 other than the holes 12 is low. As with a case when the holes 12 are not formed, it is difficult for the gas containing the mist existing in the cathode-side catalyst layer of the fuel cell to flow through the gas diffusion layer 100. Therefore, even in a case when the dew point of the steam contained in the gas to be supplied to the fuel cell is lower than the temperature of the fuel cell, the fuel cell including the gas diffusion layer 100 can appropriately generate electric power while preventing the polymer electrolyte membrane from drying.

Since excessive moisture is suitably discharged through the holes 12, the possibility that the region when liquid water accumulates is locally generated at the boundary between the catalyst layer and the gas diffusion layer 10 is reduced. Therefore, the possibility that the gas diffusion layer is pushed up by the water pressure generated by the region where the water accumulates is reduced, and the possibility that the gas diffusion layer is separated from the catalyst layer to be deformed is reduced.

Manufacturing Method

Figure 2:
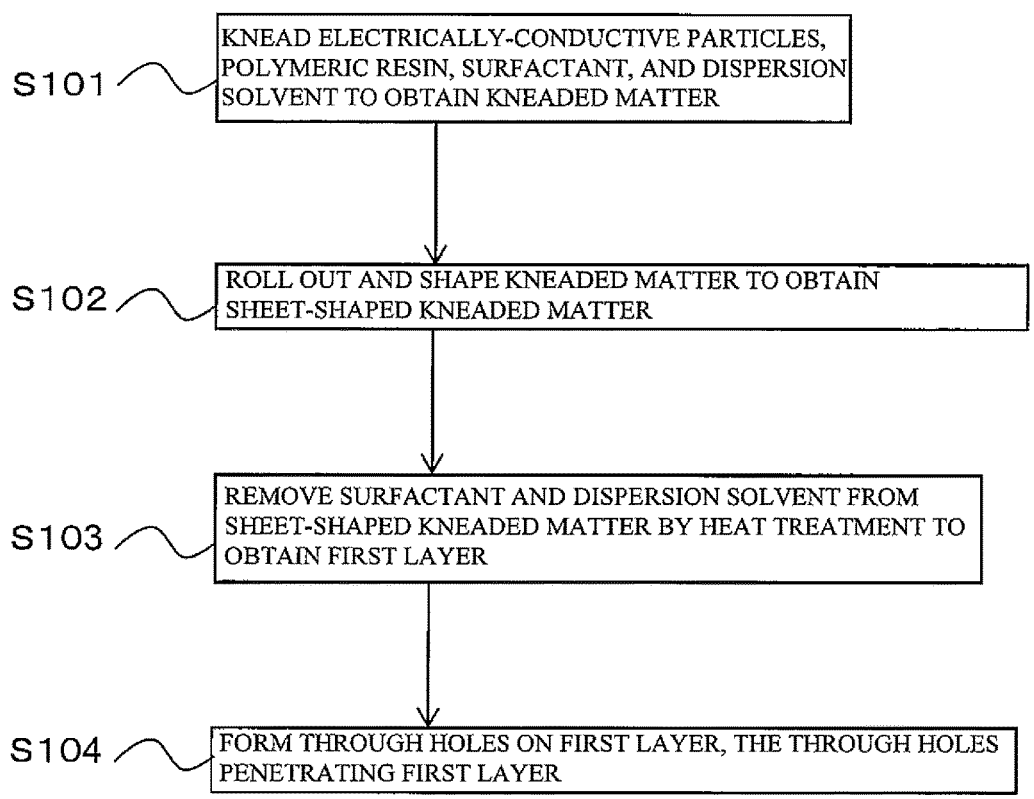
FIG. 2 is a flow chart showing one example of a method of manufacturing the gas diffusion layer according to Embodiment 1.

FIG. 2 is a flow chart showing one example of a method of manufacturing the gas diffusion layer according to Embodiment 1. Hereinafter, a method of manufacturing the gas diffusion layer 100 of Embodiment 1 will be explained in reference to FIG. 2.

The first layer 10 can be manufactured by kneading a mixture containing the polymeric resin and the electrically-conductive particles and then performing extrusion, roll-out, and firing.

Specifically, for example, first, the kneaded matter is obtained by kneading the electrically-conductive particles, the polymeric resin, the surfactant, and the dispersion solvent (Step S101). The content of the electrically-conductive particles in the kneaded matter may be, for example, not less than 10 wt % and not more than 50 wt %. The content of the polymeric resin in the kneaded matter may be, for example, not less than 1 wt % and not more than 20 wt %.

Examples of the dispersion solvent that is one of raw materials of the kneaded matter include water, alcohol (such as methanol and ethanol), and glycol (such as ethylene glycol). In a case where the water is used as the dispersion solvent, the cost can be reduced, and the environmental load can also be reduced.

The content of the dispersion solvent in the kneaded matter may be, for example, not less than 30 wt % and not more than 88 wt %.

Examples of the surfactant that is one of the raw materials of the kneaded matter include a negative ion surfactant, a positive ion surfactant, an amphoteric surfactant, and a nonionic surfactant. Specific examples of the surfactant include a nonion type, such as polyoxyethylene alkyl ether, and an amphoteric ion type, such as alkyl amine oxide. To remove the surfactant and to prevent the catalysts from being poisoned by metal ions, the nonionic surfactant may be used as the surfactant. Examples of the nonionic surfactant include polyoxyethylene alkyl ether, polyoxyethylene alkyl phenol ether, alkyl glucoside, polyoxyethylene fatty acid ester, sucrose fatty acid ester, sorbitan fatty acid ester, and fatty acid alkanolamide.

The content of the surfactant in the kneaded matter may be, for example, not less than 0.1 wt % and not more than 5 wt %.

The content of the dispersion solvent in the kneaded matter and the content of the surfactant in the kneaded matter can be suitably selected based on the types of the electrically-conductive particles and polymeric resin, the compounding ratio of the polymeric resin and the electrically-conductive particles, and the like. Generally, as the content of the dispersion solvent and the content of the surfactant increase, the polymeric resin and the electrically-conductive particles disperse more uniformly. In a case where each of the content of the dispersion solvent and the content of the surfactant is set to a certain content or less, the flowability does not become too high, and the formation of the sheet can be facilitated.

More specifically, the electrically-conductive particles, the dispersion solvent, and the surfactant are put in a stirring kneader to be kneaded, crushed, and granulated. Thus, the electrically-conductive particles are dispersed in the dispersion solvent. Next, the polymeric resin is further put in the stirring kneader to be stirred and kneaded. Thus, the electrically-conductive particles and the polymeric resin are dispersed in the dispersion solvent. The kneaded matter is obtained by this method.

Next, the sheet-shaped kneaded matter is obtained by rolling out and shaping the kneaded matter (Step S102). The sheet-shaped kneaded matter is the kneaded matter rolled out and shaped to have a sheet shape. To roll out and shape the kneaded matter, for example, a rolling press machine, a plate press machine, or the like may be used. The thickness of the sheet-shaped kneaded matter is suitably adjusted such that the thickness of the first layer becomes a desired value.

Next, the dispersion solvent and the surfactant are removed from the obtained sheet-shaped kneaded matter by the heat treatment. Thus, the first layer 10 is obtained (Step S103). The heat treatment of the sheet-shaped kneaded matter can be performed by, for example, a firing furnace, an electric furnace, a gas furnace, or the like. Hereinafter, a heating temperature of the heat treatment of the sheet-shaped kneaded matter is referred to as the first heat treatment temperature.

The first heat treatment temperature can be set to 260° C. or higher. By setting the first heat treatment temperature to 260° C. or higher, it becomes easy to remove the surfactant from the sheet-shaped kneaded matter at such a pace that the mass productivity can be secured.

The first heat treatment temperature can be set to not higher than the melting point of the polymeric resin that is one of the raw materials of the kneaded matter. By setting the first heat treatment temperature to not higher than the melting point of the polymeric resin that is one of the raw materials of the kneaded matter, the polymeric resin is less likely to melt, the strength as the structure is less likely to decrease, and the sheet shape is less likely to be lost.

In the case of using the PTFE as the polymeric resin, the melting point of the polymeric resin is not lower than 330° C. and not higher than 350° C., and the temperature in the heat treatment at the first heat treatment temperature may be set to not lower than 260° C. and not higher than 330° C.

The heating temperature and heating time of the heat treatment may be set to such a temperature and time that: the surfactant and the dispersion solvent are adequately removed from the sheet-shaped kneaded matter; and the crystallization of the polymeric resin proceeds. The residual amount of the surfactant and the dispersion solvent can be measured based on, for example, an analytical result of a TG/DTA (thermogravimetry/differential thermal analyzer). The residual amount may be set to 1 wt % or less of the entire weight of the first layer 10. The residual amount can be suitably controlled by adjusting the thickness of the first layer 10 and the heat treatment temperature and time.

Next, a plurality of holes 12 are formed on the first layer 10 so as to penetrate the first layer 10 (Step S104). A method of forming the holes 12 is not especially limited. Specifically, for example, the holes 12 may be formed by inserting a needle made of metal. Or, for example, the holes 12 may be formed by using a laser, such as a UV laser or a $CO_2$ laser. Or, for example, the holes 12 may be formed by using a mold that is used to shape the first layer 10 and provided with the penetrating members and by pouring the materials into the mold. To be specific, the holes 12 may be formed simultaneously with the formation of the first layer 10 or may be formed after the formation of the first layer 10. In other words, Step S104 may be executed simultaneously with Steps S102 and S103.

Example 1

In Example 1, the membrane-electrode-gas diffusion layer assembly including the gas diffusion layer of Embodiment 1 was manufactured, and an electric power generation test was performed.

Figure 3:
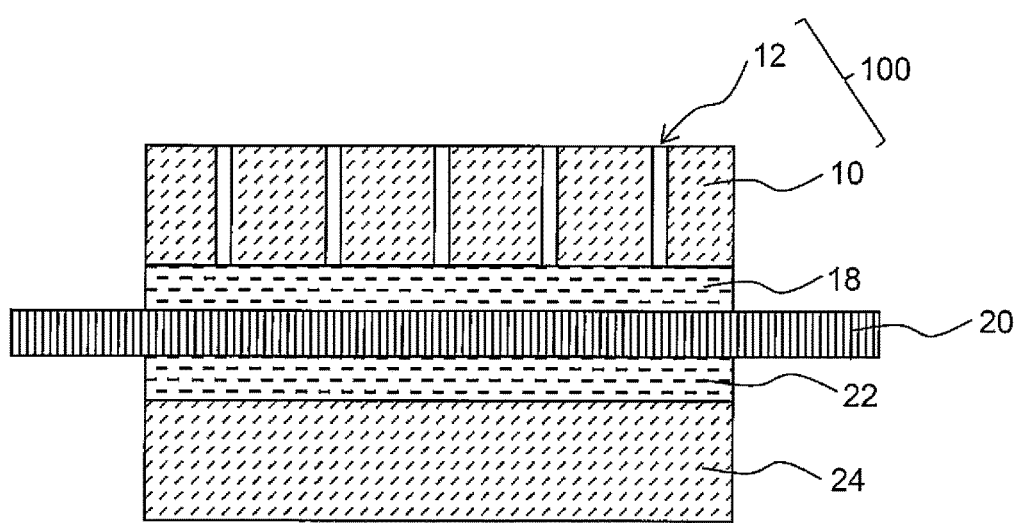
FIG. 3 is a cross-sectional view showing a schematic configuration of a membrane-electrode-gas diffusion layer assembly according to Example 1.

FIG. 3 is a cross-sectional view showing a schematic configuration of the membrane-electrode-gas diffusion layer assembly according to Example 1. As shown in FIG. 3, the membrane-electrode-gas diffusion layer assembly of Example 1 is configured such that: a cathode catalyst layer 18 is provided on a cathode-side main surface of a polymer electrolyte membrane 20; an anode catalyst layer 22 is provided on an anode-side main surface of the polymer electrolyte membrane 20; the gas diffusion layer 100 is provided on one of main surfaces of the cathode catalyst layer 18, the one main surface being opposite to a main surface contacting the polymer electrolyte membrane 20; and a gas diffusion layer 24 is provided on one of main surfaces of the anode catalyst layer 22, the one main surface being opposite to a main surface contacting the polymer electrolyte membrane 20.

The gas diffusion layer 100 includes the first layer 10 including the porous member containing the electrically-conductive particles and the polymeric resin as the major components. A plurality of holes 12 are formed on the first layer 10 so as to penetrate the first layer 10. The gas diffusion layer 24 includes the porous member containing the electrically-conductive particles and the polymeric resin as the major components, but holes are not formed on the gas diffusion layer 24.

In Example 1, a membrane-electrode assembly was manufactured by the following method.

To be specific, a cathode catalyst layer forming ink was prepared by dispersing, in a mixed dispersion medium of ethanol and water (the mass ratio of ethanol to water is 1:1), catalyst supporting carbon (TEC10E50E produced by Tanaka Kikinzoku Kogyo; 50 mass % thereof is Pt) in which platinum particles that are electrode catalysts are supported on carbon powder, and a polymer electrolyte solution (Aquivion D79-20BS produced by Solvay Solexis Inc.) having hydrogen ion conductivity. The polymer electrolyte was added such that the mass of the polymer electrolyte in the catalyst layer after the application formation became 0.4 time the mass of the catalyst supporting carbon.

The obtained cathode catalyst layer forming ink was applied to one of surfaces of the polymer electrolyte membrane (GSII produced by Japan Gore-Tex Inc.; 150 mm*150 mm) by a spraying method. Thus, the cathode catalyst layer was formed such that the supported amount of platinum became 0.3 mg/cm$^2$.

At the time of the application of the catalyst layer, a base material (PET) obtained by punching to have a size of 140 mm*140 mm was utilized as a mask.

Next, an anode catalyst layer forming ink was prepared by dispersing, in a mixed dispersion medium of ethanol and water (the mass ratio of ethanol to water is 1:1), catalyst supporting carbon (TEC61E54 produced by Tanaka Kikinzoku Kogyo; 50 mass % thereof is Pt—Ru alloy) in which platinum ruthenium alloy (the mole ratio (mass ratio) of platinum to ruthenium is 1:1.5) particles that are electrode catalysts are supported on carbon powder, and a polymer electrolyte solution (Aquivion D79-20BS produced by Solvay Solexis Inc.) having hydrogen ion conductivity. The polymer electrolyte was added such that the mass of the polymer electrolyte in the catalyst layer after the application formation became 0.4 time the mass of the catalyst supporting carbon.

The obtained anode catalyst layer forming ink was applied to the other surface of the polymer electrolyte membrane by the spraying method, the other surface being opposite to the surface on which the cathode catalyst layer is formed. Thus, the anode catalyst layer was formed to include a single-layer structure and also formed such that the supported amount of platinum became 0.2 mg/cm$^2$.

The shape of the mask and how to use the mask were the same as those when manufacturing the cathode catalyst layer.

In Example 1, the gas diffusion layer was manufactured by the following method.

50 grams of acetylene black (Denim Black produced by Denki Kagaku Kogyo Kabushiki Kaisha), 80 grams of graphite (produced by Wako Pure Chemical Industries, Ltd.), 3 grams of VGCF (produced by Showa Denko K.K.; the fiber diameter is 0.15 µm), 4 grams of a surfactant (Triton X), 200 grams of water were put in a mixer to be kneaded. Next, 25 grams of a ME dispersion (AD911 produced by Asahi Glass Co., Ltd.; the solid content ratio is 60 wt %) was put into the mixer to be stirred for five more minutes. Thus, the kneaded matter was obtained. 20 grams of the obtained kneaded matter was taken out from the mixer, and the sheet-shaped kneaded matter having a thickness of 600 µm was formed by a stretching roller (a gap thereof is 600 µm). After that, the sheet-shaped kneaded matter was subjected to the heat treatment in the firing furnace at 300° C. for two hours. Thus, the surfactant and the water were removed from the kneaded matter. The sheet-shaped kneaded matter from which the surfactant and the water were removed was taken out from the firing furnace and then rolled out again by the stretching roller (the gap thereof is 400 µm) to adjust the thickness and reduce the unevenness of the thickness. After that, the kneaded matter was cut into pieces each having a 14-cm square. Thus, the rubber-like first layer having a thickness of 400 µm was manufactured.

The air resistance of the first layer was measured by the B type device of the Gurley method based on JIS-P8177:2009. As a result, the air resistance of the first layer was 850 seconds.

A cathode gas diffusion layer was formed in such a manner that through holes each having a diameter of 230 µm were formed on the first layer, obtained by the above method, by completely inserting a needle made of a kanthal wire (iron-chromium-aluminium alloy) into the first layer.

Figure 4:
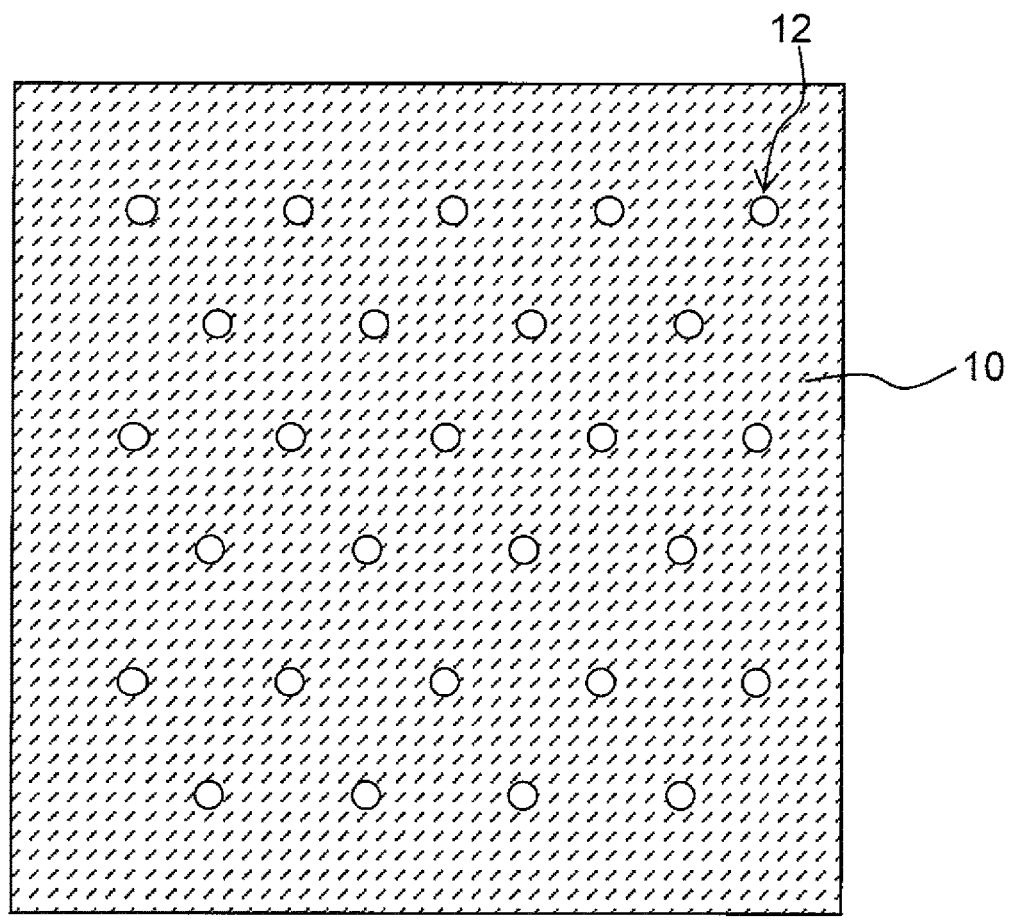
FIG. 4 is a plan view schematically showing a schematic configuration of the gas diffusion layer according to Example 1.

FIG. 4 is a plan view schematically showing a schematic configuration of the gas diffusion layer according to Example 1. As shown in FIG. 4, the gas diffusion layer of Example 1 was formed such that the holes 12 were arranged in a zig-zag alignment on the first layer 10.

The pitch of the through holes was about 3 mm, and the distance between the adjacent through holes was set to about 3 mm. Regarding the density of the through holes, eleven through holes were formed per 1 cm$^2$. The opening area of the through holes per 1 cm$^2$ of the area of the first layer was 0.0046 cm$^2$. The total of the areas of the opening portions of the through holes was 0.46% of the area of the first layer.

As an anode gas diffusion layer, the first layer was used without forming the through holes.

The membrane-electrode-gas diffusion layer assembly of Example 1 was obtained in such a manner that: the cathode gas diffusion layer and anode gas diffusion layer manufactured as above were caused to contact the membrane-electrode assembly manufactured by the above method; and hot pressing was performed at 120° C. and 6 kgf/cm$^2$ for five minutes to cause the catalyst layer and the gas diffusion layer to be joined to each other.

Comparative Example 1

In Comparative Example 1, the membrane-electrode-gas diffusion layer assembly including the gas diffusion layer having a carbon cloth was manufactured, and the electric power generation test was performed.

In Comparative Example 1, the membrane-electrode assembly was manufactured in the same manner as Example 1.

In Comparative Example 1, the gas diffusion layer was manufactured by the following method.

A carbon cloth (SK-1 produced by Mitsubishi Chemical Corporation) having a thickness of 270 µm was immersed in a fluorocarbon resin-containing aqueous dispersion (ND-1 produced by Daikin Industries, Ltd.) and then dried. Thus, water repellency was given to the carbon cloth (water repellent finish) Next, after the water repellent finish, a water-repellent carbon layer was formed on one (entire surface) of surfaces of the carbon cloth. A water-repellent carbon layer forming ink was prepared by mixing electrically-conductive carbon powder (Denka Black (Product Name) produced by Denki Kagaku Kogyo Kabushiki Kaisha) and an aqueous solution (D-1 produced by Daikin Industries, Ltd.) in which polytetrafluoroethylene (PTFE) fine powder was dispersed. The water-repellent carbon layer was formed by applying, by a doctor blade technique, the water-repellent carbon layer forming ink to one of the surfaces of the carbon cloth after the water repellent finish. After that, the carbon cloth after the water repellent finish and the formation of the water-repellent carbon layer was subjected to the firing at 350° C. for 30 minutes. Thus, the gas diffusion layer including the carbon cloth was obtained.

The air resistance of the gas diffusion layer including the carbon cloth was measured by the B type device of the Gurley method based on JIS-P8177:2009. As a result, the air resistance of the gas diffusion layer including the carbon cloth was 0.4 second.

In Comparative Example 1, the cathode gas diffusion layer and the anode gas diffusion layer were manufactured by the same method.

The membrane-electrode-gas diffusion layer assembly of Comparative Example 1 was obtained in such a manner that: the cathode gas diffusion layer and anode gas diffusion layer manufactured as above were caused to contact the membrane-electrode assembly manufactured by the above method; and hot pressing was performed at 120° C. and 6 kgf/cm$^2$ for five minutes to cause the catalyst layer and the gas diffusion layer to be joined to each other.

Comparative Example 2

In Comparative Example 2, the gas diffusion layer was produced without forming the through holes on the first layer obtained by the same method as Example 1, and the membrane-electrode-gas diffusion layer assembly including the gas diffusion layer was manufactured. Then, the electric power generation test was performed.

In Comparative Example 2, the membrane-electrode assembly was manufactured in the same manner as Example 1.

In Comparative Example 2, the first layer was manufactured in the same manner as Example 1.

The air resistance of the first layer was measured by the B type device of the Gurley method based on JIS-P8177:2009. As a result, the air resistance of the first layer was 777 seconds.

In Comparative Example 2, as each of the cathode gas diffusion layer and the anode gas diffusion layer, the first layer was utilized without forming the through holes.

The membrane-electrode-gas diffusion layer assembly of Example 2 was obtained in such a manner that: the cathode gas diffusion layer and anode gas diffusion layer manufactured as above were caused to contact the membrane-electrode assembly manufactured by the above method; and hot pressing was performed at 120° C. and 6 kgf/cm$^2$ for five minutes to cause the catalyst layer and the gas diffusion layer to be joined to each other.

Electric Power Generation Test

The fuel cells respectively including the membrane-electrode-gas diffusion layer assemblies of Example 1, Comparative Example 1, and Comparative Example 2 were manufactured. Each of unit cells was manufactured such that: the membrane-electrode-gas diffusion layer assembly was sandwiched between a separator including a gas channel for fuel gas supply and a cooling water channel and a separator including a gas channel for oxidizing gas supply; gaskets made of fluorocarbon rubber were respectively arranged around a cathode and an anode to be located between the separators; and the area of an effective electrode (the anode or the cathode) was 196 cm$^2$.

The temperature of each of the unit cells of Example 1, Comparative Example 1, and Comparative Example 2 was maintained at 65° C. A mixture gas of a hydrogen gas and carbon dioxide (75% of the mixture gas was the hydrogen gas, and 25% of the mixture gas was the carbon dioxide) was supplied as the fuel gas to the anode-side gas channel, and air was supplied to the cathode-side gas channel. A hydrogen gas utilization ratio was 70%, and an air utilization ratio was 40%. After each of the fuel gas and the air was humidified such that the dew point thereof became about 65° C., the fuel gas and the air were supplied to the unit cell.

First, aging (activation treatment) of each of the unit cells was performed in such a manner that the unit cell was caused to generate electric power for 12 hours at a current density of 0.2 A/cm$^2$.

After that, room temperature start-up was performed as below. First, the electric power generation of each of the unit cells was stopped, and the temperatures of the unit cells were decreased to room temperature (about 25° C.). After that, the dew point of the fuel gas was set to about 65° C., and the fuel gas was then supplied to the anode. The air was not humidified, and the dry air (having a dew point of −45° C.) was supplied to the cathode. Then, the electric power generation of each unit cell was started up at a current density of 0.25 A/cm$^2$. Further, after the electric power generation was started, the temperature of the unit cell was increased up to 65° C. This process is called room temperature start-up since the temperature of the unit cell at the time of the start of the electric power generation was room temperature.

After the first room temperature start-up, the electric power generation was continued for four hours. Then, the voltages of the unit cells were measured. After the room temperature start-up was repeatedly performed 100 times, the electric power generation test was terminated. Then, the fuel cells were disassembled, and the number of portions at each of which the cathode-side gas diffusion layer was separated from the catalyst layer was confirmed. The portion at which the cathode-side gas diffusion layer was separated from the catalyst layer denotes a portion where the gas diffusion layer slightly floated from the catalyst layer. In each of these samples, the portion at which the gas diffusion layer was separated from the catalyst layer was not found at the anode side.

Results of the electric power generation test are shown in Table 1.

TABLE 1

| Samples | Voltage (mV) | Number of Separated Portions |
| --- | --- | --- |
| Example 1 First Layer and Through Holes | 748 | 8 |
| Comparative Example 1 Carbon Cloth | 720 | 0 |
| Comparative Example 2 First Layer | 749 | 67 |

As shown in Table 1, the voltages of the unit cells of Example 1, Comparative Example 1, and Comparative Example 2 were respectively 748 mV, 720 mV, and 749 mV. That is, the voltage of Example 1 was substantially equal to the voltage of Comparative Example 2 and higher than the voltage of Comparative Example 1. This may be because as compared to Comparative Example 1 using the carbon cloth, each of Example 1 and Comparative Example 2 each including the first layer including the porous member containing the electrically-conductive particles and the polymeric resin as the major components effectively prevented the electrolyte membrane from drying, so that the electric power generation efficiency of each of Example 1 and Comparative Example 2 was improved.

As shown in Table 1, the numbers of separated portions of Example 1, Comparative Example 1, and Comparative Example 2 were respectively 8, 0, and 67. That is, the number of separated portions of Example 1 was substantially equal to that of Comparative Example 1 and significantly smaller than that of Comparative Example 2. This may be because as compared to Comparative Example 2 including the first layer having high air resistance and not including the through holes, in each of Example 1 including the first layer having high air resistance and including the through holes and Comparative Example 1 having low air resistance, the region when liquid water accumulated was less likely to be locally generated at the boundary between the catalyst layer and the gas diffusion layer, so that the gas diffusion layer was less likely to be pushed up by the water pressure generated by the region where the water was accumulated.

As above, regarding the voltage, Example 1 showed an excellent result that is substantially equal to Comparative Example 2, and regarding the number of separated portions, Example 1 showed an excellent result that is substantially equal to Comparative Example 1. To be specific, it was found that the gas diffusion layer of Example 1 can simultaneously achieve the conflicting objects that are, in the combination of the low humidification operation and the room temperature start-up, the execution of the appropriate electric power generation while preventing the polymer electrolyte membrane from drying and the reduction in the possibility that the gas diffusion layer is separated from the catalyst layer to deform.

Embodiment 2

The fuel cell gas diffusion layer of Embodiment 2 corresponds to the fuel cell gas diffusion layer according to each of Embodiment 1 and its modification example and further includes: a first layer including the porous member containing the electrically-conductive particles and the polymeric resin as the major components; and a second layer including the porous member containing the electrically-conductive particles and the polymeric resin as the major components, formed so as to contact the first layer, and having higher water repellency than the first layer, wherein the holes are formed so as to penetrate the first layer and the second layer.

The method of manufacturing the fuel cell gas diffusion layer of Embodiment 2 corresponds to the method of manufacturing the fuel cell gas diffusion layer according to each of Embodiment 1 and its modification example and further includes: mixing electrically-conductive particles, polymeric resin, a surfactant, and a dispersion solvent to obtain a homogeneous dispersing liquid; before forming the holes on the first layer, coating the first layer with the dispersing liquid and drying the dispersing liquid to form a dispersing liquid layer that is thinner than the first layer; and subjecting the first layer, on which the dispersing liquid layer has been formed, to a heat treatment at a second heat treatment temperature lower than the first heat treatment temperature to remove the surfactant and the dispersion solvent from the dispersing liquid layer and thus form a second layer on the first layer, the second layer having higher water repellency than the first layer, wherein in the step of forming the holes on the first layer, the holes are formed so as to also penetrate the second layer.

The second layer has higher water repellency than the first layer. The mist generated by the electric power generating reaction is less likely to adher to the second layer. Therefore, the mist can move in the second layer more smoothly than in the first layer. Since the second layer exists between the catalyst layer and the first layer, the movement of the mist in a direction (surface direction) parallel to the main surface of the polymer electrolyte membrane is accelerated in the second layer, and the amount of mist moving from the catalyst layer to the boundary between the first layer and the second layer or to the first layer decreases.

When the temperature of the fuel cell is low, such as when the fuel cell is started up, the kinetic energy of the mist is low. Therefore, a part of the mist moving in the second layer tends to adhere to the first layer at the boundary between the first layer and the second layer. On the mist adhered as a core to the first layer, the mist existing in the vicinity of the boundary between the first layer and the second layer aggregates one after another. As a result, the region where water accumulates is locally generated at the boundary between the first layer and the second layer. The gas diffusion layer of Embodiment 2 includes the holes penetrating the first layer and the second layer. Since the water existing in the above region can be discharged through the holes to the outside of the gas diffusion layer, the possibility that the gas diffusion layer deforms by the water pressure can be further reduced.

Device Configuration

Figure 5:
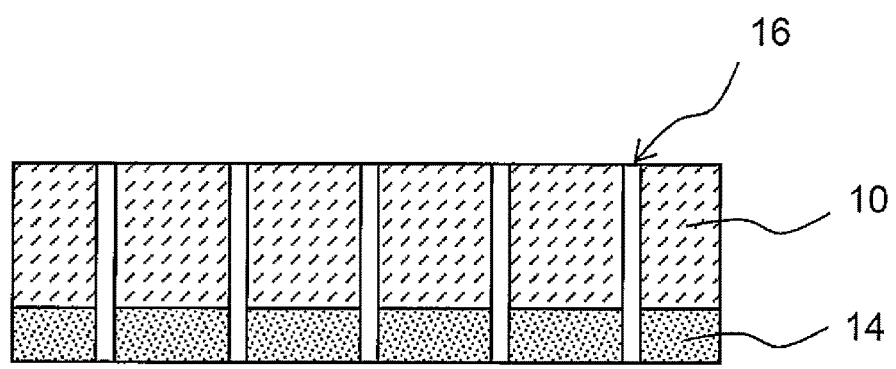
FIG. 5 is a cross-sectional view showing one example of a schematic configuration of the gas diffusion layer according to Embodiment 2.

FIG. 5 is a cross-sectional view showing one example of a schematic configuration of the gas diffusion layer according to Embodiment 2. Hereinafter, a gas diffusion layer 200 of Embodiment 2 will be explained in reference to FIG. 5.

As shown in FIG. 5, the gas diffusion layer 100 includes the first layer 10 and the second layer 14. To be specific, Embodiment 2 explains a case where the gas diffusion layer is constituted by two layers.

The gas diffusion layer 200 may be formed as, for example, a gas diffusion layer (so-called base material less GDL) that does not contain carbon fiber as the base material.

The first layer 10 herein is the same as that in Embodiment 1 except that the reference sign of the hole penetrating the first layer 10 is changed from 12 to 16. Therefore, a detailed explanation of the first layer 10 is omitted.

The second layer 14 includes the porous member containing the electrically-conductive particles and the polymeric resin as the major components, is formed so as to contact the first layer 10, and has higher water repellency than the first layer 10.

The second layer 14 may be the porous member containing the electrically-conductive particles and the polymeric resin as the major components. The second layer 14 may include the porous member containing the electrically-conductive particles and the polymeric resin as the major components, the electrically-conductive particles being the carbon fiber, the weight of which is smaller than that of the polymeric resin. The porous member may contain the carbon fiber of not less than 2.0 wt % and not more than 7.5 wt %. The porous member may contain the polymeric resin of not less than 10 wt % and not more than 17 wt %. The second layer 14 can be configured so as not to contain the base material.

The porosity of the second layer 14 may be not less than 42% and not more than 75%.

In a case where the gas diffusion layer 200 is used in the fuel cell, the second layer 14 may be arranged so as to contact the catalyst layer. The first layer may be arranged so as to contact the separator.

Since the electrically-conductive particles and the polymeric resin herein are the same as those in Embodiment 1, detailed explanations thereof are omitted.

The water repellency can be evaluated based on a contact angle of a water droplet when liquid water is dropped onto the surface. To be specific, the larger the contact angle is, the higher the water repellency is. When the contact angle is 180°, the surface does not get wet at all, and the water repellency is maximum. When the contact angle is 0°, the surface completely gets wet, and the water repellency is minimum. Factors that affect the water repellency may be the hydrophobic property and hydrophilic property of a material constituting a layer and the porosity (surface area) of the material constituting the layer. If the material constituting the layer has the hydrophobic property, the water repellency may be high. If the porosity of the material constituting the layer is high, the water repellency may be high. Therefore, the water repellency becomes an index regarding whether or not the mist easily move through the inside of the layer.

The water repellency can be adjusted by changing the content of the polymeric resin in each layer and the porosity (surface area) of the material constituting each layer. For example, the water repellency of the second layer 14 can be made higher than that of the first layer 10 by setting the content of the polymeric resin in the second layer 14 to be higher than the content of the polymeric resin in the first layer 10 and constituting the second layer 14 by a material having higher porosity (surface area) than the first layer 10.

The second layer 14 may be thinner than the first layer 10. The thickness of the second layer 14 may be set to, for example, not less than 10 μm and not more than 100 μm. In a case when the thickness of the second layer 14 is not less than 10 μm, the adhesion strength between the second layer 14 and the catalyst layer can be secured more easily. In a case where the thickness of the second layer 14 is not more than 100 μm, the surfactant can be removed even at a low heat treatment temperature at such a pace that the mass productivity can be secured.

The compositions of the electrically-conductive particles and polymeric resin constituting the second layer 14 may be different from the compositions of the electrically-conductive particles and polymeric resin constituting the first layer 10.

The content of the polymeric resin in the second layer 14 may be higher than the content of the polymeric resin in the first layer 10. By increasing the content of the polymeric resin in the second layer 14, the water repellency of the second layer 14 increases, so that the mist generated by the electric power generating reaction is less likely to adhere to the second layer 14. Therefore, the mist can move in the second layer 14 more smoothly than in the first layer 10.

In addition to the polymeric resin and the electrically-conductive particles, the second layer 14 may contain the dispersion solvent, the surfactant, and the like. Examples of the dispersion solvent include water, alcohol (such as methanol and ethanol), and glycol (such as ethylene glycol). Examples of the surfactant include nonionic surfactants (such as polyoxyethylene alkyl ether) and amphoteric ion surfactants (such as alkyl amine oxide).

The content of the dispersion solvent in the second layer 14 and the content of the surfactant in the second layer 14 can be suitably selected based on the types of the electrically-conductive particles and polymeric resin constituting the second layer 14, the compounding ratio of the polymeric resin and the electrically-conductive particles, and the like. Generally, as the content of the dispersion solvent and the content of the surfactant increase, the polymeric resin and the electrically-conductive particles disperse more uniformly. In a case where each of the content of the dispersion solvent and the content of the surfactant is set to a certain content or less, the flowability does not become too high, and the formation of the sheet can be facilitated.

The second layer 14 may contain materials (for example, short carbon fiber) other than the electrically-conductive particles, the polymeric resin, the surfactant, and the dispersion solvent.

The holes 16 are formed so as to penetrate the first layer 10 and the second layer 14. To be specific, in the present embodiment, the holes 16 are through holes penetrating the first layer 10 and the second layer 14. The other points, such as the shape of the hole 16, the number of holes 16, the size of the hole 16, the arrangement of the holes 16, and the method of forming the holes 16, may be the same as those of the holes 12 of Embodiment 1. Therefore, detailed explanations thereof are omitted.

Manufacturing Method

Figure 6:
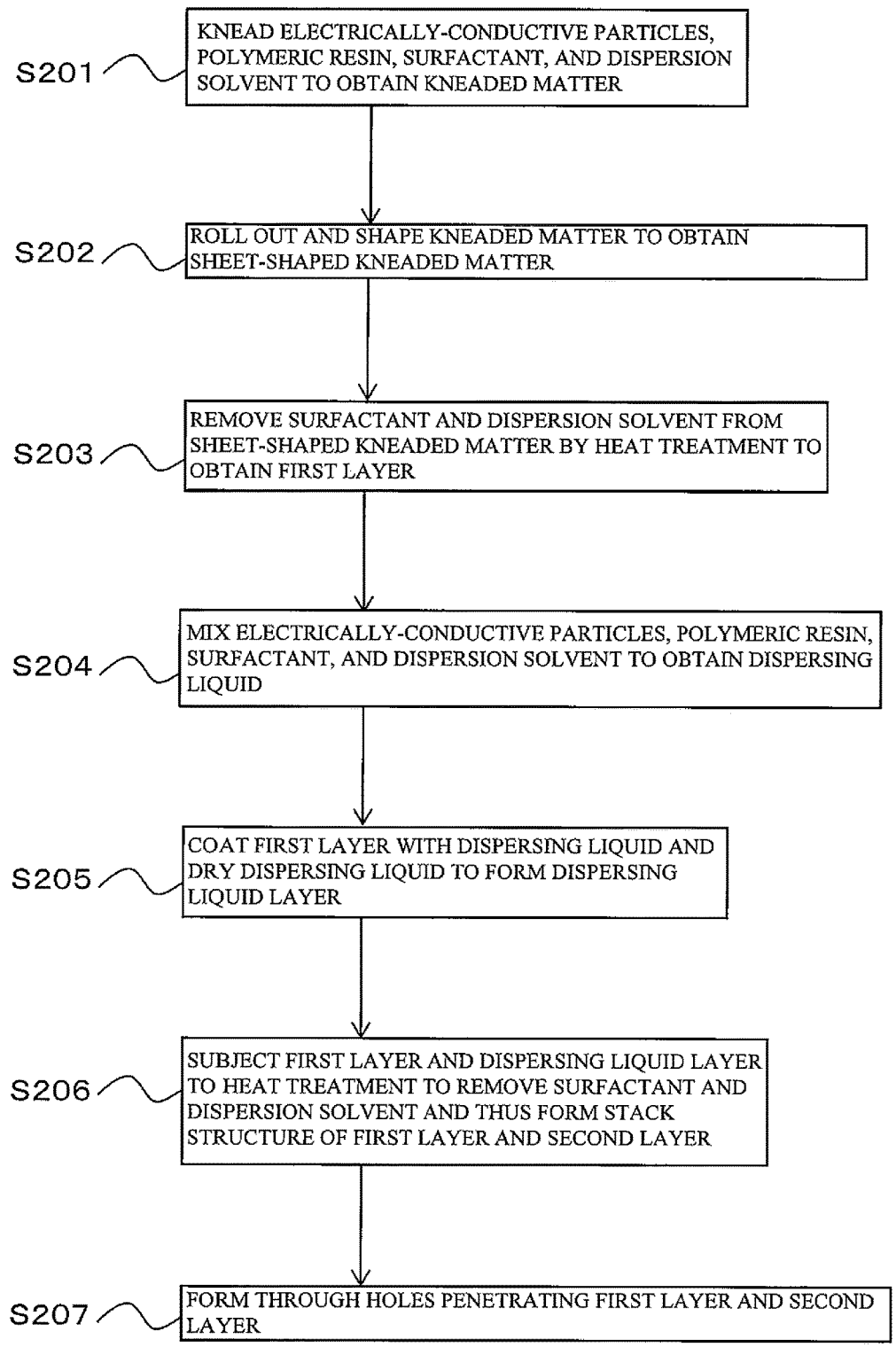
FIG. 6 is a flow chart showing one example of the method of manufacturing the gas diffusion layer according to Embodiment 2.

FIG. 6 is a flow chart showing one example of a method of manufacturing the gas diffusion layer according to Embodiment 2. Hereinafter, a method of manufacturing the gas diffusion layer 200 of Embodiment 2 will be explained in reference to FIG. 6.

Since Steps S201 to S203 herein are the same as Steps S101 to S103 in Embodiment 1, detailed explanations thereof are omitted.

When the first layer 10 is obtained in Step S203, the second layer 14 is formed by the following method.

First, the dispersing liquid is obtained by mixing the electrically-conductive particles, the polymeric resin, the surfactant, and the dispersion solvent (Step S204). More specifically, for example, a mixture of the surfactant and the dispersion solvent is subjected to a dispersion treatment. Then, the carbon fine powder and the fluorocarbon resin are added to the mixture, and the mixture is further subjected to the dispersion treatment. However, without subjecting the surfactant to the dispersion treatment in advance, all the materials including the surfactant may be subjected to the dispersion treatment at the same time.

The materials explained above as the examples of the material of the electrically-conductive particle that is the raw material of the first layer 10 can be used as the material of the electrically-conductive particle that is the raw material of the dispersing liquid. The material of the electrically-conductive particle that is the raw material of the kneaded matter and the material of the electrically-conductive particle that is the raw material of the dispersing liquid may be the same as or different from each other. The content of the electrically-conductive particles in the dispersing liquid can be set to, for example, not less than 1 wt % and not more than 30 wt %.

The materials explained above as the examples of the material of the polymeric resin that is the raw material of the first layer 10 can be used as the material of the polymeric resin that is the raw material of the dispersing liquid. The material of the polymeric resin that is the raw material of the kneaded matter and the material of the polymeric resin that is the raw material of the dispersing liquid may be the same as or different from each other. The content of the polymeric resin in the dispersing liquid can be set to, for example, not less than 0.1 wt % and not more than 10 wt %.

The materials explained above as the examples of the material of the surfactant that is the raw material of the kneaded matter of the first layer 10 can be used as the material of the surfactant that is the raw material of the dispersing liquid. The material of the surfactant that is the raw material of the kneaded matter and the material of the surfactant that is the raw material of the dispersing liquid may be the same as or different from each other. It is desirable that the content of the surfactant in the dispersing liquid be, for example, not less than 0.1 wt % and not more than 5 wt %.

The materials explained above as the examples of the material of the dispersion solvent that is the raw material of the first layer 10 can be used as the material of the dispersion solvent that is the raw material of the dispersing liquid. The material of the dispersion solvent that is the raw material of the kneaded matter and the material of the dispersion solvent that is the raw material of the dispersing liquid may be the same as or different from each other. It is desirable that the content of the dispersion solvent in the dispersing liquid be, for example, not less than 55 wt % and not more than 98 wt %.

Next, the dispersing liquid layer that is thinner than the first layer is formed by coating the first layer 10 with the dispersing liquid and drying the dispersing liquid (Step S205). As the coating of the dispersing liquid, a known printing or coating technology, such as spray coating, screen printing, or die coating, can be used. As the drying method, drying by a hotplate, drying by a drying furnace, or the like can be used.

Next, by subjecting the first layer 10 and the dispersing liquid layer to the heat treatment, the surfactant and the dispersion solvent are removed. Thus, a stack structure of the first layer 10 and the second layer 14 is obtained (Step S206).

The heat treatment of the dispersing liquid layer formed on the first layer 10 can be performed by, for example, an electric furnace, a gas furnace, or a far infrared heating furnace. Hereinafter, the heating temperature of the heat treatment of the dispersing liquid layer is referred to as the second heat treatment temperature.

The second heat treatment temperature can be set to not lower than a decomposition temperature of the surfactant that is the raw material of the dispersing liquid. For example, the second heat treatment temperature can be set to 220° C. or higher. By setting the second heat treatment temperature to 220° C. or higher, the surfactant is easily removed from the dispersing liquid layer at such a pace that the mass productivity can be secured.

The second heat treatment temperature can be set to 240° C. or higher. By setting the second heat treatment temperature to 240° C. or higher, the surfactant can be easily removed down to 1 wt % or less of the carbon layer.

The second heat treatment temperature can be set to lower than 260° C. By setting the second heat treatment temperature to lower than 260° C., the deterioration of the adhesion property of the surface of the carbon layer is suppressed, so that high adhesive force can be obtained when causing the carbon layer and the catalyst layer to adhere to each other.

The heat treatment may be performed in the air. Regarding the heat treatment of the dispersing liquid layer, the material, thickness, temperature, time, and the like may be set such that, for example, the surfactant is adequately removed, and the adhesion property of the dispersing liquid layer with the catalyst layer does not deteriorate by the crystallization of the polymeric resin. The second layer 14 is formed by the heat treatment.

The heating temperature of the heat treatment when forming the second layer 14 may be lower than the heat treatment temperature when forming the first layer 10, and the heating temperature and heating time of the heat treatment when forming the second layer 14 may be set to such a temperature and time that: the surfactant and the dispersion solvent are adequately removed from the dispersing liquid layer; and the crystallization of the polymeric resin is less likely to proceed. To be specific, the second heat treatment temperature can be set to be lower than the first heat treatment temperature. The residual amount of the surfactant and the dispersion solvent can be measured based on, for example, the analytical result of the TG/DTA (thermogravimetry/differential thermal analyzer). The residual amount may be set to 1 wt % or less of the entire weight of the second layer 14. The residual amount can be suitably controlled by adjusting the thickness of the second layer 14 and the heat treatment temperature and time.

With this, the porosity (surface area) of the second layer 14 can be made higher than the porosity (surface area) of the first layer 10. By increasing the porosity (surface area) of the second layer, the water wettability of the second layer 14 decreases, so that the mist generated by the electric power generating reaction is less likely to adhere to the second layer 14. Therefore, the mist can move in the second layer 14 more smoothly than in the first layer 10. As above, increasing the porosity (surface area) of the second layer 14 achieves the same effect as increasing the amount of the polymeric resin of the second layer 14.

Next, the gas diffusion layer is obtained by forming a plurality of holes 16 penetrating the first layer 10 and the second layer 14 (Step S207). A method of forming the holes 16 is not especially limited. Specifically, for example, the holes 16 may be formed by inserting a needle made of metal. Or, for example, the holes 16 may be formed by using a laser, such as a UV laser or a $CO_2$ laser. Or, for example, the holes 16 may be formed by using a mold that is used when shaping the first layer 10 and the second layer 14 and provided with penetrating members and by pouring the materials into the mold. To be specific, the holes 16 may be formed simultaneously with the formation of the first layer 10 and the second layer 14 or may be formed after the formation of the second layer 14. In other words, Step S207 may be executed simultaneously with Step S102 or Step S206.

Example 2

In Example 2, the membrane-electrode-gas diffusion layer assembly including the gas diffusion layer of Embodiment 2 was manufactured, and the electric power generation test was performed.

Figure 7:
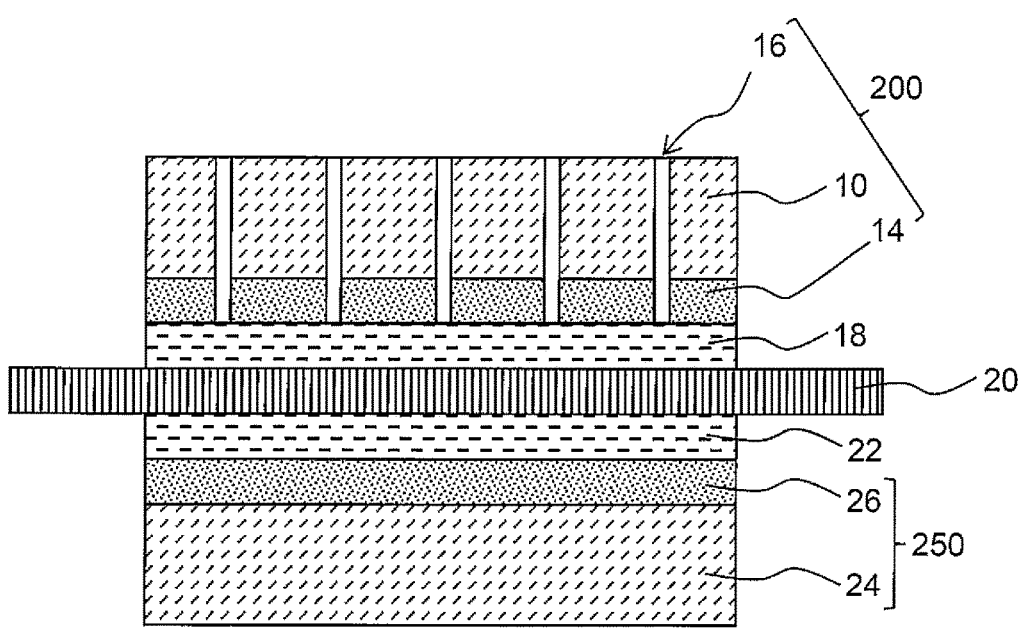
FIG. 7 is a cross-sectional view showing a schematic configuration of the membrane-electrode-gas diffusion layer assembly according to Example 2.

FIG. 7 is a cross-sectional view showing a schematic configuration of the membrane-electrode-gas diffusion layer assembly according to Example 2. As shown in FIG. 7, the membrane-electrode-gas diffusion layer assembly of Example 2 is configured such that: the cathode catalyst layer 18 is provided on the cathode-side main surface of the polymer electrolyte membrane 20; the anode catalyst layer 22 is provided on the anode-side main surface of the polymer electrolyte membrane 20; the gas diffusion layer 200 is provided on one of main surfaces of the cathode catalyst layer 18, the one main surface being opposite to a main surface contacting the polymer electrolyte membrane 20; and a gas diffusion layer 250 is provided on one of main surfaces of the anode catalyst layer 22, the one main surface being opposite to a main surface contacting the polymer electrolyte membrane 20.

The gas diffusion layer 200 includes: the first layer 10 including the porous member containing the electrically-conductive particles and the polymeric resin as the major components; and the second layer 14 including the porous member containing the electrically-conductive particles and the polymeric resin as the major components, formed so as to contact the first layer 10, and having higher water repellency than the first layer 10, and the holes 16 are formed so as to penetrate the first layer 10 and the second layer 14. The second layer 14 contacts the cathode catalyst layer 18.

The gas diffusion layer 250 includes: a layer 24 including the porous member containing the electrically-conductive particles and the polymeric resin as the major components; and a layer 26 including the porous member containing the electrically-conductive particles and the polymeric resin as the major components, formed so as to contact the layer 24, and having higher water repellency than the layer 24, and holes are not formed on the layer 24 or the layer 26. The layer 26 contacts the anode catalyst layer 22.

In Example 2, the membrane-electrode assembly was manufactured in the same manner as Example 1.

In Example 2, the first layer was manufactured in the same manner as Example 1.

Next, the second layer was manufactured by the following method.

151 grams of water and 1 gram of a surfactant (Triton X) were put in a container, and the dispersion treatment of the surfactant was performed in a rotation and revolution type stirring defoaming device. Next, 10 grams of acetylene black (Denka Black produced by Denki Kagaku Kogyo Kabushiki Kaisha) and 5.5 grams of a FIFE dispersion (AD911 produced by Asahi Glass Co., Ltd.; the solid content ratio is 60 wt %) were put in the container, and the dispersion treatment of the acetylene black and the PTFE was performed in the rotation and revolution type stirring defoaming device. Further, coarse particles were removed by using a filter (made of SUS; 200 mesh), and a deforming treatment was then performed by using the rotation and revolution type stirring defoaming device. Thus, the dispersing liquid was obtained. The obtained dispersing liquid was applied by the spraying method to one of surfaces of the first layer placed on the hotplate. Substantially the entire amount of dispersing liquid was removed by the drying using the hotplate (60° C.). Thus, the dispersing liquid layer was manufactured. More specifically, the weight of the dried dispersing liquid layer was adjusted to 2.0 mg/cm$^2$. After that, the surfactant was removed from the dispersing liquid layer by subjecting a carbon sheet, on which the dispersing liquid layer was formed, to the heat treatment at 240° C. for two hours in the firing furnace. Thus, the second layer was formed. With this, the stack body in which the second layer was stacked on the first layer was obtained.

The air resistance of the obtained stack body was measured by the B type device of the Gurley method based on JIS-P8177:2009. As a result, the air resistance of the obtained stack body was 853 seconds.

The cathode gas diffusion layer was formed in such a manner that through holes each having a diameter of 230 μm were formed on the stack body, obtained by the above method, by completely inserting the needle made of the kanthal wire (iron-chromium-aluminium alloy) into the stack body.

As with Example 1, the gas diffusion layer of Example 2 was formed such that the through holes were arranged in a zig-zag alignment on the stack body.

The pitch of the through holes was about 3 mm, and the distance between the adjacent through holes was set to about 3 mm. Regarding the density of the through holes, eleven through holes were formed per 1 $cm^2$. The opening area of the through holes per 1 $cm^2$ of the area of the first layer was 0.0046 $cm^2$. The total of the areas of the opening portions of the through holes was 0.46% of the area of the first layer.

As the anode gas diffusion layer, the stack body was used without forming the through holes.

The membrane-electrode-gas diffusion layer assembly of Example 2 was obtained in such a manner that: the cathode gas diffusion layer and anode gas diffusion layer manufactured as above were caused to contact the membrane-electrode assembly manufactured by the above method; and hot pressing was performed at 120° C. and 6 kgf/$cm^2$ for five minutes to cause the catalyst layer and the gas diffusion layer to be joined to each other.

The water repellency can be evaluated by using a known wettability measuring technology. Specifically, the evaluation was performed by using a wettability evaluation device (DropMaster100 produced by Kyowa Interface Science Co., Ltd.). First, the gas diffusion layer including the first layer and the second layer was cut into pieces each having a size of 3*5 cm. In a state when the gas diffusion layer was immersed in distilled water in a beaker, it was left for an hour in a vacuum container. After the gas diffusion layer was adequately impregnated with the water, it was dried at 80° C. for four hours. Thus, the wet state was uniformized. Next, the dried gas diffusion layer was cut into pieces each having a 1-cm square, and the piece was set on a measuring stage of the wettability evaluation device. By using a microsyringe, 4 μl, of a wet tension test liquid mixture (wet tension of 27.3 mN/m, Wako Pure Chemical Industries, Ltd.) was dropped onto each of a surface of the first layer and a surface of the second layer. After three minutes from the dropping, the contact angle of the wet tension test liquid mixture was measured. As a result, the contact angle of the liquid mixture on the first layer was 72°, and the contact angle of the liquid mixture on the second layer was 130°, that is, the contact angle of the liquid mixture on the second layer was larger than that on the first layer. Thus, the water repellency of the second layer was higher than that of the first layer.

Comparative Example 3

In Comparative Example 3, the gas diffusion layer was manufactured without forming the through holes on the stack body obtained in the same manner as Example 2, and the membrane-electrode-gas diffusion layer assembly including this gas diffusion layer was manufactured. Then, the electric power generation test was performed.

In Comparative Example 3, the membrane-electrode assembly was manufactured in the same manner as Example 1.

In Comparative Example 3, the stack body was manufactured in the same manner as Example 2.

The air resistance of the stack body was measured by the B type device of the Gurley method based on JIS-P8177:2009. As a result, the air resistance of the stack body was 802 seconds.

In Comparative Example 3, as each of the cathode gas diffusion layer and the anode gas diffusion layer, the stack body was used without forming the through holes.

The membrane-electrode-gas diffusion layer assembly of Example 2 was obtained in such a manner that: the cathode gas diffusion layer and anode gas diffusion layer manufactured as above were caused to contact the membrane-electrode assembly manufactured by the above method; and hot pressing was performed at 120° C. and 6 kgf/$cm^2$ for five minutes to cause the catalyst layer and the gas diffusion layer to be joined to each other.

Electric Power Generation Test

The electric power generation test was performed by using the membrane-electrode-gas diffusion layer assemblies obtained in Example 2 and Comparative Example 3. Since the method of the electric power generation test herein is the same as those of Example 1, Comparative Example 1, and Comparative Example 2, a detailed explanation thereof is omitted.

Results of the electric power generation test are shown in Table 2.

TABLE 2

| Samples | Voltage (mV) | Number of Separated Portions |
|---|---|---|
| Example 2 First Layer, Second Layer, and Through Holes | 744 | 0 |
| Comparative Example 1 Carbon Cloth | 720 | 0 |
| Comparative Example 3 First Layer and Second Layer | 744 | 39 |

As shown in Table 2, the voltages of the unit cells of Example 2, Comparative Example 1, and Comparative Example 3 were respectively 744 mV, 720 mV, and 744 mV. That is, the voltage of Example 2 was equal to the voltage of Comparative Example 3 and higher than the voltage of Comparative Example 1. This may be because as compared to Comparative Example 1 using the carbon cloth, each of Example 2 and Comparative Example 3 each including the first layer including the porous member containing the electrically-conductive particles and the polymeric resin as the major components effectively prevented the electrolyte membrane from drying, so that the electric power generation efficiency of each of Example 2 and Comparative Example 3 was improved.

As shown in Table 2, the numbers of separated portions of Example 2, Comparative Example 1, and Comparative Example 3 were respectively 0, 0, and 39. That is, the number of separated portions of Example 2 is equal to that of Comparative Example 1, that is, zero, and was significantly smaller than that of Comparative Example 3. This may be because as compared to Comparative Example 3 including the first layer having high air resistance and not including the through holes, in each of Example 1 including the first layer having high air resistance and including the through holes and Comparative Example 1 having low air resistance, the region when liquid water accumulated was less likely to be locally generated at the boundary between the catalyst layer and the gas diffusion layer, so that the gas diffusion layer was less likely to be pushed up by the water pressure generated by the region where the water was accumulated.

In addition, the number of separated portions of Example 2 was made further smaller than the number of separated portions of Example 1. This may be because in Example 2 including the second layer having high water repellency, the movement of the mist in the second layer in a direction parallel to the main surface of the polymer electrolyte membrane was accelerated more than that in Example 1 not including the second layer having high water repellency, and the amount of mist moving from the catalyst layer to the first layer was decreased. To be specific, this may be because in Example 2 as compared to Example 1, the region where liquid water accumulated was less likely to be locally generated at the boundary between the catalyst layer and the gas diffusion layer, and the possibility that the gas diffusion layer is pushed up by the water pressure generated by the region where the water was accumulated was further reduced.

As above, regarding the voltage, Example 2 showed an excellent result that is substantially equal to Comparative Example 3, and regarding the number of separated portions, Example 2 showed an excellent result that is substantially equal to Comparative Example 1 and better than Example 1. To be specific, it was found that the gas diffusion layer of Example 2 can further effectively achieve the conflicting objects that are, in the combination of the low humidification operation and the room temperature start-up, the execution of the appropriate electric power generation while preventing the polymer electrolyte membrane from drying and the reduction in the possibility that the gas diffusion layer is separated from the catalyst layer to deform.

Embodiment 3

The fuel cell gas diffusion layer of Embodiment 3 corresponds to the fuel cell gas diffusion layer according to each of Embodiments 1 and 2 and their modification examples, and an opening area of the holes is not less than 0.1% and not more than 1.2% of an area of the main surface of the fuel cell gas diffusion layer.

In the above fuel cell gas diffusion layer, an opening area of the holes may be not less than 0.3% and not more than 1.1% of an area of the main surface of the fuel cell gas diffusion layer.

In the above fuel cell gas diffusion layer, an opening area of the holes may be not less than 0.5% and not more than 1.0% of an area of the main surface of the fuel cell gas diffusion layer.

Studies in Embodiment 3

The present inventors have diligently studied to improve the electric power generation efficiency of the fuel cell including the fuel cell gas diffusion layer including the porous member containing the electrically-conductive particles and the polymeric resin as the major components. As a result, the present inventors have obtained the following findings.

To be specific, the air permeance of the gas diffusion layer of the fuel cell that was a target studied is low. Therefore, even in a case when the dew point of the gas to be supplied is lower than the temperature of the fuel cell, the fuel cell can appropriately generate electric power while preventing the polymer electrolyte membrane from drying. However, it was found that the fuel cell that is the target studied causes a problem that in a case where the fuel cell starts generating electric power from a state where the temperature of the fuel cell is low, the gas diffusion layer deforms.

This is because: the region where water accumulates is locally generated at the boundary between the catalyst layer and the gas diffusion layer; the gas diffusion layer is pushed up by the water pressure generated by this region; and the gas diffusion layer is separated from the catalyst layer.

Here, the present inventors have conceived the idea of forming the holes on the gas diffusion layer and discharging the accumulated water through the holes. With this, since the catalyst layer contacts outside air at a position immediately under the holes, the pressure at the position is close to atmospheric pressure. In addition, even in a case where the water pressure is generated around the holes, the water flows to the holes in each of which the pressure is low. Thus, the increase in the water pressure by the accumulation of the water can be reduced.

However, as a result of further studies, it was found that there is a possibility that if the opening area of the holes are too large in a case when the through holes are formed on the gas diffusion layer, the catalyst layer and the electrolyte membrane get dry, and the life of the fuel cell shortens. The reason for this may be the following mechanism.

To be specific, in a case where the holes are formed, the catalyst layer in the hole is directly exposed to the comparatively dry oxidizing gas or fuel gas. Therefore, the drying of the catalyst layer accelerates, and the electrochemical reaction on the catalysts is not smoothly performed. As a result, the amount of radicals generated increases, and the amount of generated water that washes away the radicals decreases. Thus, the chemical decomposition of the electrolyte membrane accelerates.

At a portion facing the channel of the separator, the gas diffusion layer is not fixed by a rib of the separator, so that it easily deforms. At the portion facing the channel of the separator, the gas concentration becomes high, and the chemical deterioration of the electrolyte membrane by drying tends to accelerate. For example, by appropriately forming the holes on the gas diffusion layer along the channel of the separator, the chemical deterioration of the electrolyte membrane can be reduced while reducing the deformation of the gas diffusion layer.

Device Configuration

The fuel cell gas diffusion layer of the present embodiment may be the same in configuration as each of the fuel cell gas diffusion layers of Embodiments 1 and 2 and their modification examples except for the opening area of the holes. Therefore, a detailed explanation thereof is omitted except for the opening area of the holes.

In the present embodiment, the opening area of the holes (the holes 12 and the holes 16; hereinafter referred to as "holes") is not less than 0.1% and not more than 1.2% of the area of the main surface of the fuel cell gas diffusion layer. The opening area of the holes may be not less than 0.3% and not more than 1.1% of the area of the main surface of the fuel cell gas diffusion layer. The opening area of the holes may be not less than 0.5% and not more than 1.0% of the area of the main surface of the fuel cell gas diffusion layer.

Even if the opening area of the holes is small, the effect of reducing the deformation of the gas diffusion layer can be obtained by the formation of the holes. Therefore, the lower limit of the opening area of the holes may be suitably set to a predetermined value larger than zero in reference to the following experimental example.

If the opening area of the holes is large, the chemical deterioration of the electrolyte membrane easily proceeds. Therefore, the upper limit of the opening area of the holes may be suitably set in reference to the following experimental example.

In the present embodiment, the diameter of the hole may be not less than 30 µm and not more than 300 µm. The diameter of the hole may be not less than 50 µm and not more than 275 µm. The diameter of the hole may be not less than 80 µm and not more than 250 µm.

In the present embodiment, the pitch of the holes may be not less than 0.8 mm and not more than 3.2 mm. The pitch of the holes may be not less than 1 mm and not more than 3 mm. Regarding the pitch of the holes, a pitch x (a distance from the center of a certain hole to the center of a hole adjacent to the certain hole; the same is true hereinafter) in a direction parallel to the gas channel and a pitch y (in a case where the holes are formed in rows each parallel to the gas channel, a distance between a line passing through the centers of the holes of a certain row and a line passing through the centers of the holes of a row adjacent to the certain row; the same is true hereinafter) in a direction perpendicular to the gas channel may be different from each other.

Figure 8:
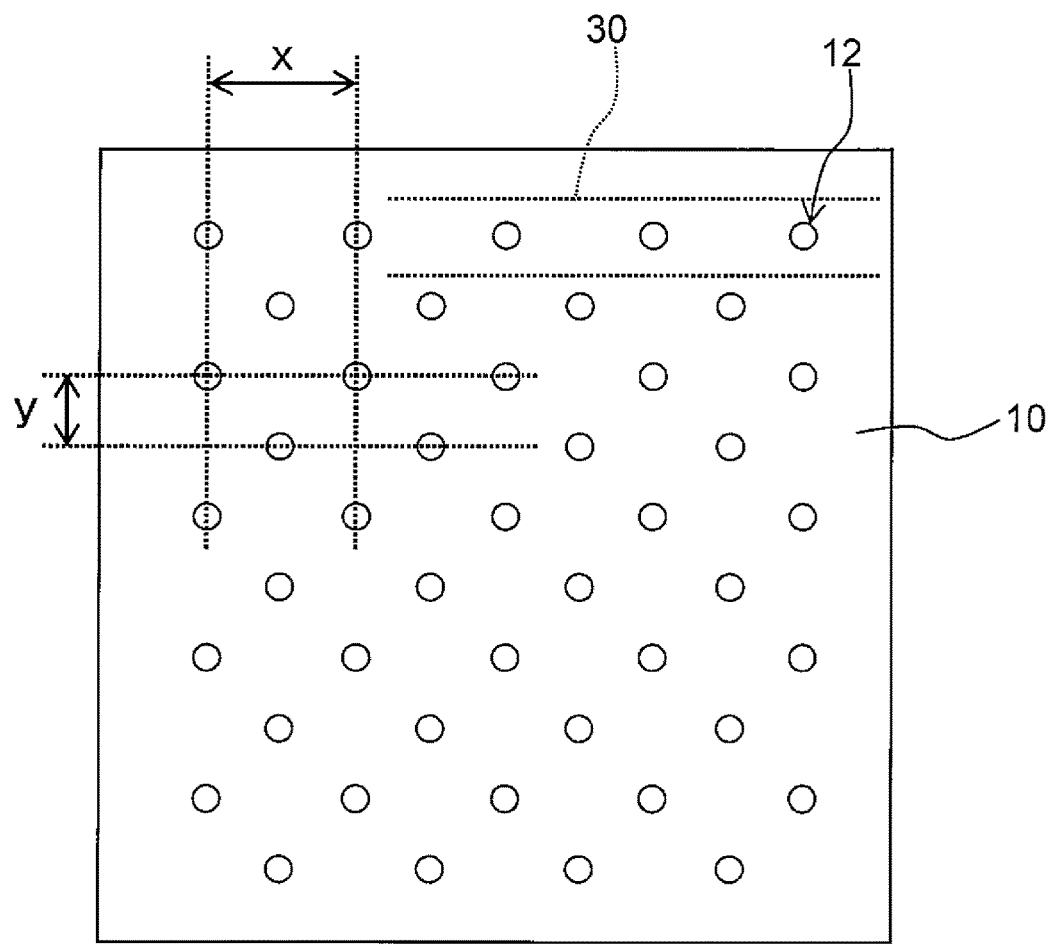
FIG. 8 is a schematic diagram for explaining a pitch of holes in Embodiment 3.

FIG. 8 is a schematic diagram for explaining the pitch of the holes in Embodiment 3. In the example shown in FIG. 8, the holes are arranged in a zig-zag alignment (rows of the holes 12 are displaced from each other by a half pitch, the rows being adjacent to each other in the direction perpendicular to the gas channel 30), and the pitch x in the direction parallel to the gas channel 30 is larger than the pitch y in the direction perpendicular to the gas channel 30. In the present embodiment, a gas channel is not formed on the gas diffusion layer. The gas channel 30 in FIG. 8 shows the direction of (a part of) the gas channel formed on the separator used when incorporating the gas diffusion layer in the fuel cell. For example, the gas channel can be configured such that: five adjacent channels are formed as one unit; the width of each channel is 1 mm; the pitch of the channels is 2 mm; and the channels turn back at an end of the gas diffusion layer with no space.

In the present embodiment, the holes do not have to be formed at regular intervals. For example, the pitch of the holes may differ depending on the position on the main surface of the gas diffusion layer. The holes may be formed only on a part of the main surface of the gas diffusion layer.

The gas diffusion layer of Embodiment 3 may be modified in the same manner as that of Embodiment 1 or Embodiment 2.

Manufacturing Method

The method of manufacturing the fuel cell gas diffusion layer of the present embodiment may be the same as the method of manufacturing the fuel cell gas diffusion layer of each of Embodiments 1 and 2 and their modification examples. Therefore, a detailed explanation thereof is omitted. The method of manufacturing the gas diffusion layer of Embodiment 3 may be modified in the same manner as that of Embodiment 1 or Embodiment 2.

Comparative Example 3

The holes were not formed on the sample of Comparative Example 3. Specifically, the sample of the membrane-electrode-gas diffusion layer assembly was manufactured in the same manner as Comparative Example 3 of Embodiment 2.

Example 3

In Example 3, the gas diffusion layer was manufactured such that the opening area of the holes became 0.52% of the area of the main surface of the gas diffusion layer. In Example 3, as with Embodiment 2, the second layer was formed on the first layer, and the holes were formed so as to penetrate both the first layer and the second layer.

The holes were formed on the sample of Example 3 by using the needle. The diameter of the hole was substantially the same as the diameter (about 230 µm) of the needle. Regarding the pitch of the holes, the pitch x in the direction parallel to the gas channel was 3.0 mm, and the pitch y in the direction perpendicular to the gas channel was 2.6 mm. The holes were arranged in a zig-zag alignment (rows of the holes were displaced from each other by a half pitch, the rows being adjacent to each other in the direction perpendicular to the gas channel) The shape of the gas diffusion layer was a square of 140 mm*140 mm. The area of the main surface of the gas diffusion layer was 19,600 $mm^2$. The area of one hole was 0.042 $mm^2$. The number of holes was 2,450. The opening area of the holes was 102 $mm^2$. Therefore, the opening area of the holes in Example 3 was 0.52% of the area of the main surface of the fuel cell gas diffusion layer. The other configurations were the same as those of Example 2 of Embodiment 2. Thus, the membrane-electrode-gas diffusion layer assembly was obtained.

Example 4

In Example 4, the gas diffusion layer was manufactured such that the opening area of the holes became 0.97% of the area of the main surface of the gas diffusion layer. In Example 4, as with Embodiment 2, the second layer was formed on the first layer, and the holes were formed so as to penetrate both the first layer and the second layer.

The holes were formed on the sample of Example 4 by using the UV laser. The diameter of the hole was about 100 µm. Regarding the pitch of the holes, the pitch x in the direction parallel to the gas channel was 1.8 mm, and the pitch y in the direction perpendicular to the gas channel was 1.2 mm. The holes were arranged in a zig-zag alignment (rows of the holes were displaced from each other by a half pitch, the rows being adjacent to each other in the direction perpendicular to the gas channel) The shape of the gas diffusion layer was a square of 140 mm*140 mm. The area of the main surface of the gas diffusion layer was 19,600 $mm^2$. The area of one hole was 0.0079 $mm^2$. The number of holes was 24,300. The opening area of the holes was 191 $mm^2$. Therefore, the opening area of the holes in Example 4 was 0.97% of the area of the main surface of the fuel cell gas diffusion layer. The other configurations were the same as those of Example 2 of Embodiment 2. Thus, the membrane-electrode-gas diffusion layer assembly was obtained.

Comparative Example 4

In Comparative Example 4, the gas diffusion layer was manufactured such that the opening area of the hole became 1.56% of the area of the main surface of the gas diffusion layer. In Comparative Example 4, as with Embodiment 2, the second layer was formed on the first layer, and the holes were formed so as to penetrate both the first layer and the second layer.

The holes were formed on the sample of Comparative Example 4 by using the UV laser. The diameter of the hole was about 100 μm. Regarding the pitch of the holes, the pitch x in the direction parallel to the gas channel was 1 mm, and the pitch y in the direction perpendicular to the gas channel was 1.2 mm. The holes were arranged in a zig-zag alignment (rows of the holes were displaced from each other by a half pitch, the rows being adjacent to each other in the direction perpendicular to the gas channel) The shape of the gas diffusion layer was a square of 140 mm*140 mm. The area of the main surface of the gas diffusion layer was 19,600 mm². The area of one hole was 0.0079 mm². The number of holes was 39,050. The opening area of the holes was 307 mm². Therefore, the opening area of the holes in Comparative Example 4 was 1.56% of the area of the main surface of the fuel cell gas diffusion layer. The other configurations were the same as those of Example 2 of Embodiment 2. Thus, the membrane-electrode-gas diffusion layer assembly was obtained.

Electric Power Generation Test

The electric power generation test was performed using the samples of the membrane-electrode-gas diffusion layer assemblies obtained in Comparative Example 3, Example 3, Example 4, and Comparative Example 4. The elution amount of fluoride ions was measured, and the number of deformed portions of the gas diffusion layer was counted. Details of the test were as below.

The fuel cells respectively including the samples were manufactured by using the separators on which the channels were formed. To be specific, each of unit cells was manufactured such that: the membrane-electrode-gas diffusion layer assembly was sandwiched between the separator including the gas channel for fuel gas supply and the cooling water channel and the separator including the gas channel for oxidizing gas supply; and gaskets made of fluorocarbon rubber were respectively arranged around a cathode and an anode. The area of an effective electrode (the anode or the cathode) was 196 cm².

Regarding the elution amount of fluoride ions, first, the temperature of each of the unit cells of Comparative Example 3, Example 3, Example 4, and Comparative Example 4 was maintained at 65° C. The mixture gas of the hydrogen gas and carbon dioxide (75% of the mixture gas was the hydrogen gas, and 25% of the mixture gas was the carbon dioxide) was supplied as the fuel gas to the anode-side gas channel, and air was supplied to the cathode-side gas channel. The hydrogen gas utilization ratio was 70%, and the air utilization ratio was 40%. After each of the fuel gas and the air was humidified such that the dew point thereof became about 65° C., the fuel gas and the air were supplied to the unit cell. The aging (activation treatment) of each of the unit cells was performed in such a manner that the unit cell was caused to generate electric power for 12 hours at a current density of 0.2 A/cm².

After that, room temperature start-up with low humidification was performed as below. First, the electric power generation of each of the unit cells was stopped, and the temperatures of the unit cells were decreased to room temperature (about 25° C.). After that, the dew point of the fuel gas was set to 65° C., and the fuel gas was then supplied to the anode. The air was not humidified, and the dry air (having a dew point of −45° C.) was supplied to the cathode. Then, the electric power generation of each unit cell was started up at a current density of 0.25 A/cm². Further, after the electric power generation was started, the temperature of the unit cell was increased up to 65° C. This process is called room temperature low humidification start-up since the temperature of the unit cell at the time of the start of the electric power generation was room temperature, and the air to be supplied to the cathode was not humidified.

After the room temperature low humidification start-up was repeatedly performed about 500 times, the concentration of the fluoride ions in the liquid discharged from the cathode-side and anode-side gas channels was measured by using liquid chromatography. Thus, the elution amount of fluoride ions discharged from the electrolyte membrane during the electric power generation was evaluated. The elution amount of fluoride ions was evaluated based on whether or not a period is equal to or longer than a desired life of the fuel cell, the period being calculated as a period until the amount of fluoride ions eluted with time from the membrane-electrode-gas diffusion layer assembly, especially the electrolyte membrane having a predetermined thickness reaches a total elution amount that causes membrane breakage.

Regarding each of the samples after the room temperature low humidification start-up was performed about 500 times, room temperature start-up with high humidification was performed as below. First, the electric power generation of each unit cell was stopped, and the temperature of the unit cell was decreased to room temperature (about 25° C.). Then, the dew point of the fuel gas was set to 60° C., and the fuel gas was then supplied to the anode. The air was humidified such that the dew point thereof became 65° C., and the air was then supplied to the cathode. Then, the electric power generation of each unit cell was started up at a current density of 0.25 A/cm². Further, after the start of the electric power generation, the temperature of the unit cell was increased to 65° C. This process is called room temperature high humidification start-up since the temperature of the unit cell at the time of the start of the electric power generation was room temperature, and the air to be supplied to the cathode was humidified.

After the room temperature high humidification start-up was repeatedly performed about 100 times, the fuel cell was disassembled, and the number of portions at each of which the cathode-side gas diffusion layer was separated from the membrane-catalyst layer assembly was counted. The portion at which the cathode-side gas diffusion layer was separated from the membrane-catalyst layer assembly denotes a portion where the gas diffusion layer slightly floated from the membrane-catalyst layer assembly. In each of these samples, the portion at which the gas diffusion layer was separated from the membrane-catalyst layer assembly was not found at the anode side.

Results of the electric power generation test are shown in Table 3.

TABLE 3

| Samples | Pitch x (mm) | Hole Diameter (μm) | Opening Area (%) | Elution Amount of F⁻ions | Number of Separated Portions |
|---|---|---|---|---|---|
| Comparative Example 3 | — | — | 0 | Good | 76 |
| Example 3 | 3.0 | 230 | 0.52 | Good | 3 |
| Example 4 | 1.8 | 100 | 0.97 | Good | 0 |
| Comparative Example 4 | 1.0 | 100 | 1.56 | No Good | 0 |

As shown in Table 3, in Comparative Example 4, the elution amount of fluoride ions was no good since the desired life was not satisfied. However, in each of Comparative Example 3, Example 3, and Example 4, the elution amount of fluoride ions was small to a level that the desired life was satisfied. The numbers of separated portions were zero in each of Example 4 and Comparative Example 4, three in Example 3, and 76 in Comparative Example 3.

To be specific, the elution amount of fluoride ions was large in Comparative Example 4, and the number of separated portions was large in Comparative Example 3. In each of Examples 3 and 4, both the elution amount of fluoride ions and the number of separated portions were preferable.

It was confirmed from the above results that by setting a ratio of the opening area of the holes to the area of the main surface of the fuel cell gas diffusion layer within a preferable range, the deformation of the gas diffusion layer was reduced, and the chemical deterioration of the electrolyte membrane was also reduced.

Embodiment 4

The fuel cell gas diffusion layer of Embodiment 4 corresponds to the fuel cell gas diffusion layer according to each of Embodiment 1 and its modification example, and the holes are formed so as not to penetrate the fuel cell gas diffusion layer.

The fuel cell gas diffusion layer may include: a first layer including the porous member containing the electrically-conductive particles and the polymeric resin as the major components; and a second layer including the porous member containing the electrically-conductive particles and the polymeric resin as the major components, formed so as to contact the first layer, and having higher water repellency than the first layer, and the holes may be formed so as to penetrate the first layer.

In the above fuel cell gas diffusion layer, the holes may be formed so as not to penetrate the second layer.

The fuel cell of Embodiment 4 includes: an electrolyte membrane; a catalyst layer contacting a main surface of the electrolyte membrane; and the fuel cell gas diffusion layer arranged such that the second layer thereof contacts the catalyst layer, and the catalyst layer and the electrolyte membrane are not exposed in the holes.

The method of manufacturing the fuel cell gas diffusion layer of Embodiment 4 corresponds to the method of manufacturing the fuel cell gas diffusion layer according to each of Embodiment 1 and its modification example and further includes: mixing electrically-conductive particles, polymeric resin, a surfactant, and a dispersion solvent to obtain a homogeneous dispersing liquid; coating the first layer, on which the holes have been formed, with the dispersing liquid and drying the dispersing liquid to form a dispersing liquid layer that is thinner than the first layer; subjecting the first layer, on which the dispersing liquid layer has been formed, to a heat treatment at a second heat treatment temperature lower than the first heat treatment temperature to remove the surfactant and the dispersion solvent from the dispersing liquid layer and thus form a second layer on the first layer, the second layer having higher water repellency than the first layer.

Studies in Embodiment 4

The present inventors have diligently studied to improve the electric power generation efficiency of the fuel cell including the fuel cell gas diffusion layer including the porous member containing the electrically-conductive particles and the polymeric resin as the major components. As a result, the present inventors have obtained the following findings.

To be specific, the air permeance of the gas diffusion layer of the fuel cell that was a target studied is low. Therefore, even in a case when the dew point of the gas to be supplied is lower than the temperature of the fuel cell, the fuel cell can appropriately generate electric power while preventing the polymer electrolyte membrane from drying. However, it was found that the fuel cell that is the target studied causes a problem that in a case where the fuel cell starts generating electric power from a state where the temperature of the fuel cell is low, the gas diffusion layer deforms.

This is because: the region where water accumulates is locally generated at the boundary between the catalyst layer and the gas diffusion layer; the gas diffusion layer is pushed up by the water pressure generated by this region; and the gas diffusion layer is separated from the catalyst layer.

Here, the present inventors have conceived the idea of discharging the accumulated water through holes formed on the gas diffusion layer. With this, since the catalyst layer contacts outside air at a position immediately under the holes, the pressure at the position is close to atmospheric pressure. In addition, even in a case where the water pressure is generated around the holes, the water flows to the holes in each of which the pressure is low. Thus, the increase in the water pressure by the accumulation of the water can be reduced.

However, as a result of further studies, it was found that there is a possibility that if the holes are formed so as to penetrate the gas diffusion layer in a case where the holes are formed on the gas diffusion layer, the voltage decreases, or the catalysts and the electrolyte membrane deteriorate. The reason for this may be the following mechanism.

To be specific, the water repellency of the catalyst layer is lower than that of the gas diffusion layer. Therefore, in a case where the holes are formed so as to penetrate the gas diffusion layer, liquid water easily aggregates on the catalyst layer exposed in the holes and having the low water repellency (flooding). Especially, at the time of the start-up of the fuel cell system, the temperature is low, so that the saturated steam pressure is also low. Therefore, the liquid water further easily accumulates in and around the holes. If the liquid water accumulates on the surface of the catalyst layer in and around the holes, the diffusion of the gas to these portions is interfered, so that the cell reaction does not proceed smoothly. Thus, the voltage decreases.

In a case where the holes are formed so as to penetrate the gas diffusion layer, the power collection from the surface of the catalyst layer in the holes cannot be performed due to the non-existence of the gas diffusion layer in the holes. In the vicinity of the holes formed on the cathode-side gas diffusion layer, electrons lack in the catalysts contained in the catalyst layer. Thus, the catalysts are exposed to the oxidizing gas in a state where the reaction does not proceed smoothly, and the high voltage is being applied to the catalysts. As a result, there is a possibility that catalyst sintering proceeds, and the deterioration of the electrolyte membrane accelerates by the generation of the radicals.

To solve these problems, the present inventors have found that by forming the holes that do not penetrate the gas diffusion layer, the voltage can be improved, and the deterioration of the catalyst and the electrolyte membrane can be reduced.

Especially, the present inventors have found that in a case when the second layer having high water repellency is provided, and the holes are formed so as not to penetrate the second layer, the liquid water is less likely to accumulate in and around the holes, and the voltage at the time of the start-up increases. The second layer has a function of conveying the mist, generated in the catalyst, to the first layer without causing the mist to aggregate on the surfaces of the catalysts (that is, on an interface between the catalyst layer and the gas diffusion layer). In addition, the second layer has a power collection function.

Device Configuration

Figure 9:
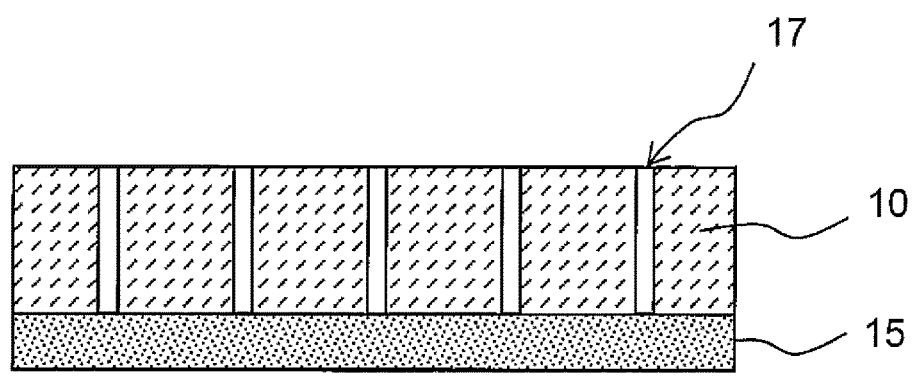
FIG. 9 is a cross-sectional view showing one example of a schematic configuration of the gas diffusion layer according to Embodiment 4.

FIG. 9 is a cross-sectional view showing one example of the schematic configuration of the gas diffusion layer according to Embodiment 4. Hereinafter, a gas diffusion layer 300 of Embodiment 4 will be explained in reference to FIG. 9.

As shown in FIG. 9, the gas diffusion layer 100 includes the first layer 10 and the second layer 15. To be specific, the following will explain a case where the gas diffusion layer is constituted by two layers. The gas diffusion layer may include layers other than the first layer and the second layer. The gas diffusion layer may be constituted only by the first layer.

The gas diffusion layer 300 may be formed as, for example, a gas diffusion layer (so-called base material less GDL) that does not contain carbon fiber as the base material.

The material, size, shape, manufacturing method, and the like of the first layer 10 herein may be the same as those of the first layer 10 of Embodiment 1 except that the reference sign of the hole penetrating the first layer is changed from 12 to 17. The material, size, shape, manufacturing method, and the like of the second layer 15 herein may be the same as those of the second layer 14 of Embodiment 2 except that the holes are not formed.

To be specific, the fuel cell gas diffusion layer of the present embodiment may be the same as each of the fuel cell gas diffusion layers according to Embodiments 1 and 2 and their modification examples except that the holes do not penetrate the gas diffusion layer. Therefore, detailed explanations of the components other than the holes 17 are omitted.

In the present embodiment, the holes 17 are formed so as not to penetrate the gas diffusion layer 300.

In the example shown in FIG. 9, the holes 17 penetrate the first layer 10 but do not penetrate the second layer 15. In the example shown in FIG. 9, the holes 17 are not formed on the second layer 15 at all. However, the holes 17 may also be formed on the second layer 15 so as not to penetrate the second layer 15. The material constituting the second layer 15 may get into a part of the hole 17 penetrating the first layer 10.

In the example shown in FIG. 9, the holes 17 penetrate the first layer 10. However, the holes 17 do not have to penetrate the first layer 10. Specifically, for example, the holes 17 may be formed on the first layer 10 so as to extend in the thickness direction from the main surface opposite to the main surface contacting the second layer 15 and so as not to cause the second layer 15 to be exposed in the holes 17.

As explained in Embodiment 1, in a case where the gas diffusion layer is constituted by a single layer, the holes may be formed, for example, so as to extend in the thickness direction from one of main surfaces of the single layer and so as not to reach the other main surface.

As explained in Embodiment 2, in a case where the gas diffusion layer is constituted by the first layer and the second layer, the holes may be formed, for example, so as to penetrate the first layer. Further, the holes may be formed so as not to penetrate the second layer. To be specific, the holes may be formed so as to extend in the thickness direction from one of main surfaces of the first layer, the one main surface being opposite to the main surface contacting the second layer, so as to penetrate the first layer to extend to the inside of the second layer, and so as not to reach one of main surfaces of the second layer, the one main surface being opposite to the main surface contacting the first layer.

In the present embodiment, the fuel cell may include: the electrolyte membrane; the catalyst layer provided so as to contact the main surface of the electrolyte membrane; and the gas diffusion layer provided such that the second layer thereof contacts the main surface of the catalyst layer, and the catalyst layer and the electrolyte membrane are not exposed in the holes.

In the present embodiment, the holes do not have to be formed at regular intervals. For example, the pitch of the holes may differ depending on the position on the main surface of the gas diffusion layer. The holes may be formed only on a part of the main surface of the gas diffusion layer.

The gas diffusion layer of Embodiment 4 may be modified in the same manner as that of Embodiment 1, 2, or 3.

Manufacturing Method

Figure 10:
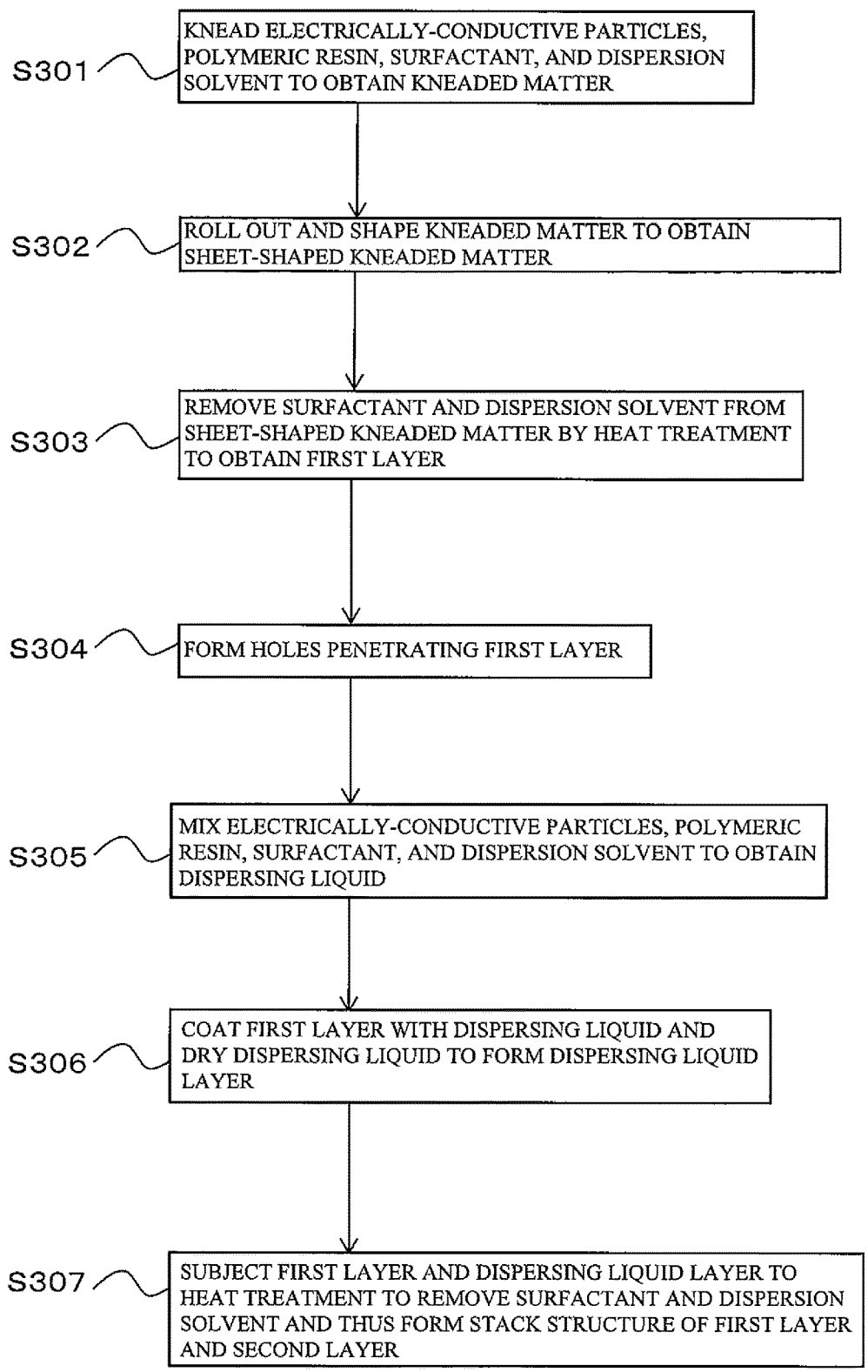
FIG. 10 is a flow chart showing one example of the method of manufacturing the gas diffusion layer according to Embodiment 4.

FIG. 10 is a flow chart showing one example of the method of manufacturing the gas diffusion layer according to Embodiment 4. Hereinafter, the method of manufacturing the gas diffusion layer of Embodiment 4 will be explained in reference to FIG. 10.

Since Steps S301 to S303 may be the same as Steps S101 to S103 of Embodiment 1, detailed explanations thereof are omitted.

When the first layer 10 is obtained in Step S303, a plurality of holes 17 penetrating the first layer 10 are formed (Step S304). A method of forming the holes 17 is not especially limited. Specifically, for example, the holes 17 may be formed by inserting a needle made of metal. Or, for example, the holes 17 may be formed by using a laser, such as a UV laser or a $CO_2$ laser. Or, for example, the holes 17 may be formed by using a mold that is used when shaping the first layer 10 and provided with penetrating members and by pouring the materials into the mold. To be specific, the holes 17 may be formed simultaneously with the formation of the first layer or may be formed after the formation of the first layer.

Next, the second layer 15 is formed by the following method.

First, the dispersing liquid is obtained by mixing the electrically-conductive particles, the polymeric resin, the surfactant, and the dispersion solvent (Step S305). Since Step S305 is the same as Step S204 of Embodiment 2, a detailed explanation thereof is omitted.

Next, the dispersing liquid layer that is thinner than the first layer is formed by coating the first layer 10 with the dispersing liquid and drying the dispersing liquid (Step S306). Since Step S306 may be the same as Step S205 of Embodiment 2, a detailed explanation thereof is omitted.

Next, by subjecting the first layer 10 and the dispersing liquid layer to the heat treatment, the surfactant and the dispersion solvent are removed. Thus, the fuel cell gas diffusion layer having the stack structure of the first layer 10 and the second layer 15 is obtained (Step S307). Since Step S307 may be the same as Step S206 of Embodiment 2, a detailed explanation thereof is omitted.

The holes 17 may be formed by using a mold that is used when shaping the first layer 10 and provided with penetrating members and by pouring the materials into the mold. To be specific, the holes 17 may be formed simultaneously with the formation of the first layer 10 or may be formed after the formation of the first layer 10. In other words, Step S304 may be performed simultaneously with Steps S303 to S307.

The method of manufacturing the gas diffusion layer of Embodiment 4 may be modified in the same manner as that of Embodiment 1, 2, or 3.

Example 2

In Example 2, in the gas diffusion layer including the first layer and the second layer, the holes were formed so as to penetrate both the first layer and the second layer. Specifically, the sample of the membrane-electrode-gas diffusion layer assembly was manufactured in the same manner as Example 2 of Embodiment 2. The number of samples of Example 2 was two.

Example 5

In Example 5, in the gas diffusion layer including the first layer and the second layer, the holes were formed so as to penetrate only the first layer. Specifically, the sample of Example 5 was manufactured by the following method. The number of samples of Example 5 was five.

The membrane-electrode assembly was manufactured in the same manner as Example 1.

The first layer was manufactured in the same manner as Example 1.

The holes were formed on the obtained first layer in the same manner as Example 1. The holes were formed so as to be arranged in a zig-zag alignment. The pitch of the holes was about 3 mm, and the holes were arranged such that the distance between the adjacent holes was about 3 mm. Regarding the density of the holes, eleven through holes were formed per 1 $cm^2$. The opening area of the holes per 1 $cm^2$ of the area of the first layer was 0.0046 $cm^2$. The total of the areas of the opening portions of the holes was 0.46% of the area of the first layer.

On the first layer on which the holes were formed, the second layer was formed in the same manner as Example 2. Thus, the stack body in which the second layer was formed on the first layer was obtained.

As the anode gas diffusion layer, the stack body obtained in the same manner as Example 2 of Embodiment 2 was utilized without forming the holes.

The other configurations were the same as those of Example 2 of Embodiment 2. Thus, the membrane-electrode-gas diffusion layer assembly was obtained.

Comparative Example 3

In Example 5, the holes were not formed on the gas diffusion layer including the first layer and the second layer. Specifically, the sample of the membrane-electrode-gas diffusion layer assembly was manufactured in the same manner as Comparative Example 3 of Embodiment 2. In Experimental Example 3, the voltage was not measured, and only the number of separated portions was measured.

Electric Power Generation Test

The electric power generation test was performed using the samples of the membrane-electrode-gas diffusion layer assemblies obtained in Example 2, Example 5, and Comparative Example 3. Thus, the voltage was measured, and the number of deformed portions of the gas diffusion layer was counted. Details of the test were as below.

The fuel cells respectively including the samples were manufactured by using the separators on which the channels were formed. To be specific, each of unit cells was manufactured such that: the membrane-electrode-gas diffusion layer assembly was sandwiched between the separator including the gas channel for fuel gas supply and the cooling water channel and the separator including the gas channel for oxidizing gas supply; and gaskets made of fluorocarbon rubber were respectively arranged around a cathode and an anode. The area of an effective electrode (the anode or the cathode) was 196 $cm^2$. Regarding each of Examples and Comparative Examples, one stack configured by connecting four unit cells in series was manufactured, and the electric power generation test was performed.

Regarding the measurement of the voltage, first, the temperature of the stack of each of Example 2, Example 5, and Comparative Example 3 was controlled to 65° C. The mixture gas of the hydrogen gas and carbon dioxide (75% of the mixture gas was the hydrogen gas, and 25% of the mixture gas was the carbon dioxide) was supplied as the fuel gas to the anode-side gas channel, and air was supplied to the cathode-side gas channel. The hydrogen gas utilization ratio was 70%, and the air utilization ratio was 40%. After each of the fuel gas and the air was humidified such that the dew point thereof became about 65° C., the fuel gas and the air were supplied to the stack. The aging (activation treatment) of each of the stacks was performed in such a manner that the stack was caused to generate electric power for 12 hours at a current density of 0.2 $A/cm^2$.

After that, room temperature start-up with low humidification was performed as below. First, the electric power generation of each of the stacks was stopped, and the temperatures of the stacks were decreased to room temperature (about 25° C.). After that, the dew point of the fuel gas was set to 65° C., and the fuel gas was then supplied to the anode. The air was not humidified, and the dry air (having a dew point of −45° C.) was supplied to the cathode. Then, the electric power generation of each stack was started up at a current density of 0.25 $A/cm^2$. Further, after the electric power generation was started, the temperature of the stack was increased up to 65° C. This process is called room temperature low humidification start-up since the temperature of the stack at the time of the start of the electric power generation was room temperature, and the air to be supplied to the cathode was not humidified.

After about 30 minutes from the start-up, the liquid water accumulates on the surfaces of the catalysts by the electric power generation under low temperature, and the voltage decreases most. After four hours from the start-up, the inside of the cell dries, and the liquid water on the surfaces of the catalysts substantially disappears. As a result, the voltage increases, and the stable electric power generation is realized with little voltage fluctuation. After the completion of the aging, the room temperature low humidification start-up was executed again. Then, the voltage after 30 minutes from the start-up and the voltage after four hours from the start-up were compared to each other. The voltages of four unit cells constituting the stack were individually measured.

Regarding each of the samples after the room temperature low humidification start-up was performed and the voltage was measured as above, room temperature start-up with high humidification was performed as below. First, the electric power generation of each stack was stopped, and the temperature of the stack was decreased to room temperature (about 25° C.). Then, the dew point of the fuel gas was set to 60° C., and the fuel gas was then supplied to the anode. The air was humidified such that the dew point thereof became 65° C., and the air was then supplied to the cathode. Then, the electric power generation of each stack was started up at a current density of 0.25 $A/cm^2$. Further, after the start of the electric power generation, the temperature of the stack was increased to 65° C. This process is called room temperature high humidification start-up since the temperature of the stack at the time of the start of the electric power generation was room temperature, and the air to be supplied to the cathode was humidified.

After the room temperature high humidification start-up was repeatedly performed about 100 times, the fuel cell was disassembled, and the number of portions at each of which the cathode-side gas diffusion layer was separated from the membrane-catalyst layer assembly was counted. The portion at which the cathode-side gas diffusion layer was separated from the membrane-catalyst layer assembly denotes a portion where the gas diffusion layer slightly floated from the membrane-catalyst layer assembly. In each of these samples, the portion at which the gas diffusion layer was separated from the membrane-catalyst layer assembly was not found at the anode side.

Results of the electric power generation test are shown in Table 4.

TABLE 4

| Samples | Voltage After 30 min. (mV) | Voltage After 4 hours (mV) | Number of Separated Portions |
|---|---|---|---|
| Example 2 Holes are formed on both the first and second layers | 738 ± 2 | 756 ± 1 | 0 |
| Example 5 Holes are formed on the first layer but not formed on the second layer | 750 ± 3 | 752 ± 1 | 0 |
| Comparative Example 3 Holes are not formed on the first or second layer | — | — | ≥30 |

As shown in Table 4, the voltage after 30 minutes from the start-up in Example 2 was 738±2 mV whereas the voltage after 30 minutes form the start-up in Example 5 was 750±3 mV, that is, significantly high. The difference between these voltages was about 12 mV, and this corresponds to 1.6% of 738 mV that is the average voltage of Example 2. To be specific, the voltage after 30 minutes form the start-up in a case where the holes do not penetrate the second layer (Example 5) was higher by about 1.6% than that in a case where the holes penetrate the second layer (Example 2).

The voltage after four hours and thirty minutes from the start-up in Example 2 was 756±1 mV whereas the voltage after four hours and thirty minutes from the start-up in Example 5 was 752±1 mV, that is, substantially the same. To be specific, the voltage after four hours and thirty minutes from the start-up in a case where the holes do not penetrate the second layer (Example 5) was substantially the same as that in a case where the holes penetrate the second layer (Example 2).

The number of separated portions in each of four unit cells of Comparative Example 3 was 30 or more, but the number of separated portions in each of four unit cells of each of Examples 2 and 5 was zero. Thus, it was found that the deformation of the gas diffusion layer was reduced in each of Examples 2 and 5.

It was confirmed from the above results that by forming the holes not penetrating the gas diffusion layer, the voltage at the time of the start-up was improved while reducing the deformation of the gas diffusion layer.

Embodiment 5

The fuel cell gas diffusion layer of Embodiment 5 includes a porous member containing electrically-conductive particles and polymeric resin as major components, a plurality of holes extending from a main surface of the fuel cell gas diffusion layer are formed, and inner portions of the holes are hydrophilized.

In the above fuel cell gas diffusion layer, the polymeric resin may be fluorocarbon resin, and the content of fluorine in a peripheral portion of the hole may be lower than that of the other portion.

In the above fuel cell gas diffusion layer, the holes may be formed so as to penetrate the fuel cell gas diffusion layer, and each of the holes may have such a shape that both ends thereof are large in diameter, and a middle portion thereof is narrow.

The fuel cell gas diffusion layer may include: a first layer including a porous member containing electrically-conductive particles and polymeric resin as major components; and a second layer including the porous member containing the electrically-conductive particles and the polymeric resin as the major components, formed so as to contact the first layer, and having higher water repellency than the first layer.

The method of manufacturing the fuel cell gas diffusion layer of Embodiment 5 includes: kneading electrically-conductive particles, polymeric resin, a surfactant, and a dispersion solvent to obtain a homogeneous kneaded matter; rolling out and shaping the kneaded matter to obtain a sheet-shaped kneaded matter; subjecting the sheet-shaped kneaded matter to a heat treatment at a first heat treatment temperature to obtain a layer formed by removing the surfactant and the dispersion solvent from the sheet-shaped kneaded matter; and forming a plurality of holes on the layer by using a laser, the holes extending from a main surface of the layer, inner portions of the holes being hydrophilized.

Studies in Embodiment 5

The present inventors have diligently studied to improve the electric power generation efficiency of the fuel cell including the fuel cell gas diffusion layer including the porous member containing the electrically-conductive particles and the polymeric resin as the major components. As a result, the present inventors have obtained the following findings.

To be specific, the air permeance of the gas diffusion layer of the fuel cell that was a target studied is low. Therefore, even in a case when the dew point of the gas to be supplied is lower than the temperature of the fuel cell, the fuel cell can appropriately generate electric power while preventing the polymer electrolyte membrane from drying. However, it was found that the fuel cell that is the target studied causes a problem that in a case where the fuel cell starts generating electric power from a state where the temperature of the fuel cell is low, the gas diffusion layer deforms.

It was thought that the deformation of the gas diffusion layer was caused since: the region where water accumulated was locally generated at the boundary between the catalyst layer and the gas diffusion layer; the gas diffusion layer was pushed up by the water pressure generated in this region; and the gas diffusion layer was separated from the catalyst layer.

A method of solving this problem may be a method of discharging the accumulated water through holes formed on the gas diffusion layer. With this, since the catalyst layer contacts outside air at a position immediately under the holes, the pressure at the position is close to atmospheric pressure. In addition, even in a case where the water pressure is generated around the holes, the water flows to the holes in each of which the pressure is low. Thus, the increase in the water pressure by the accumulation of the water can be reduced.

However, as a result of further studies, it was found that if the holes are formed by not the needle but the laser in a case where the holes are formed on the gas diffusion layer, the electric power generation efficiency improves. It was concluded that the reason for this is the following mechanism.

To be specific, in a case when the holes are formed by using laser light, the inner portions of the holes are heated to be hydrophilized (the water repellency decreases). In a case where the gas diffusion layer is manufactured by using fluorocarbon resin, the hydrophilization is caused by volatilization of fluorine. In a case where the inner portions of the holes are hydrophilized, the generated water easily accumulates in the holes to be easily discharged. As a result, the gas uniformly diffuses in the gas diffusion layer, so that the electric power generation efficiency improves.

The moisture is easily retained at a portion having the hydrophilic property. In a case where a load drastically increases during the operation of the fuel cell, the electrolyte membrane tends to dry by heat generation. Even in this case, the drying of the electrolyte membrane can be reduced by the supply of the moisture from the portion having the hydrophilic property. As a result, the electric power generation efficiency improves.

Regarding the hole formed by using the laser light, the diameter of the hole at an entrance side of the laser light is large whereas the diameter of the hole at an exit side of the laser light is small. By arranging the large-diameter side at the catalyst layer side, a high drainage property can be maintained. In addition, since the diameter of the hole at the exit side is small, the movement of the water to the separator side can be moderately restricted, so that the drying of the catalyst layer exposed in the holes can be reduced. As a result, the gas uniformly disperses in the gas diffusion layer, so that the electric power generation efficiency improves.

Device Configuration

One example of the schematic configuration of the gas diffusion layer according to Embodiment 5 may be the same as the configuration shown in FIG. 1 or 5, so that it is not shown.

In Embodiment 5, the inner portions of the holes (the holes 12 and the holes 16) are being hydrophilized. The hydrophilization may be the reduction in the water repellency.

FIGS. 11A to 11F are enlarged cross-sectional views each showing the hole and its peripheral portion of the gas diffusion layer of Embodiment 5. In the examples shown in FIGS. 11A to 11F, the hole 16 penetrates the first layer 10 and the second layer 14, and the diameter of the hole 16 is constant.

Figure 11A:
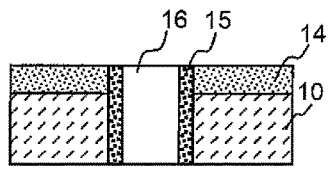
FIG. 11A is an enlarged cross-sectional view showing one example of the hole and its peripheral portion of the gas diffusion layer of Embodiment 5.

In the example shown in FIG. 11A, a hydrophilic portion 15 is formed in the hole 16, and the thickness of the hydrophilic portion 15 is constant.

Figure 11B:
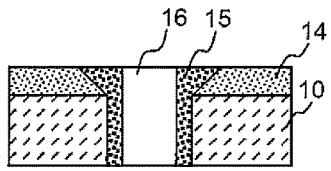
FIG. 11B is an enlarged cross-sectional view showing one example of the hole and its peripheral portion of the gas diffusion layer of Embodiment 5.

In the example shown in FIG. 11B, the hydrophilic portion 15 is formed in the hole 16 and at an opening portion of the hole 16, the opening portion being located at the second layer 14 side. The thickness of the hydrophilic portion 15 at the opening portion located at the second layer 14 side is larger than that of the other portion of the hydrophilic portion 15.

Figure 11C:
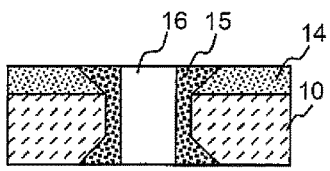
FIG. 11C is an enlarged cross-sectional view showing one example of the hole and its peripheral portion of the gas diffusion layer of Embodiment 5.

In the example shown in FIG. 11C, the hydrophilic portion 15 is formed in the hole 16 and at the opening portion located at the second layer 14 side and an opening portion located at the first layer 10 side. The thickness of the hydrophilic portion 15 at each of the opening portion located at the second layer 14 side and the opening portion located at the first layer 10 side is larger than that of the other portion of the hydrophilic portion 15.

Figure 11D:
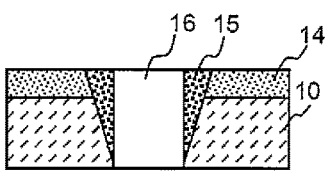
FIG. 11D is an enlarged cross-sectional view showing one example of the hole and its peripheral portion of the gas diffusion layer of Embodiment 5.

In the example shown in FIG. 11D, the hydrophilic portion 15 is formed in the hole 16, and the thickness of the hydrophilic portion 15 gradually increases from the opening portion located at the first layer 10 side toward the opening portion located at the second layer 14 side.

Figure 11E:
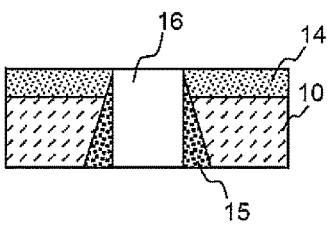
FIG. 11E is an enlarged cross-sectional view showing one example of the hole and its peripheral portion of the gas diffusion layer of Embodiment 5.

In the example shown in FIG. 11E, the hydrophilic portion 15 is formed in the hole 16, and the thickness of the hydrophilic portion 15 gradually decreases from the opening portion located at the first layer 10 side toward the opening portion located at the second layer 14 side.

Figure 11F:
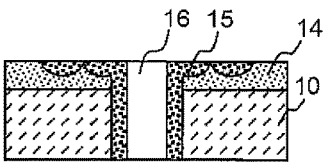
FIG. 11F is an enlarged cross-sectional view showing one example of the hole and its peripheral portion of the gas diffusion layer of Embodiment 5.

In the example shown in FIG. 11F, the hydrophilic portion 15 is formed in the hole 16 and at the opening portion and its peripheral portion located at the second layer 14 side. According to this configuration, the water (mist) efficiently moves to the hole 16 from the inside of the catalyst layer arranged so as to contact the second layer 14 and the inside of the second layer 14, so that the drainage property improves.

FIGS. 12A to 12F are enlarged plan views each showing the hole and its peripheral portion of the gas diffusion layer of Embodiment 5. These are typical examples, and the configuration of the hole and its peripheral portion is not limited to these.

Figure 12A:
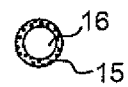
FIG. 12A is an enlarged plan view showing one example of the hole and its peripheral portion of the gas diffusion layer of Embodiment 5.

In the example shown in FIG. 12A, the opening portion of the hole 16 has a circular shape, and an outer edge of the hydrophilic portion 15 formed around the opening portion also has a circular shape.

Figure 12B:
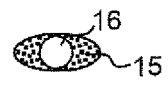
FIG. 12B is an enlarged plan view showing one example of the hole and its peripheral portion of the gas diffusion layer of Embodiment 5.

In the example shown in FIG. 12B, the opening portion of the hole 16 has a circular shape, and the outer edge of the hydrophilic portion 15 formed around the opening portion of the hole 16 has an oval shape.

Figure 12C:
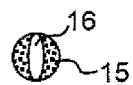
FIG. 12C is an enlarged plan view showing one example of the hole and its peripheral portion of the gas diffusion layer of Embodiment 5.

In the example shown in FIG. 12C, the opening portion of the hole 16 has an oval shape, and the outer edge of the hydrophilic portion 15 formed around the opening portion of the hole 16 has a circular shape.

Figure 12D:
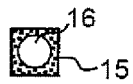
FIG. 12D is an enlarged plan view showing one example of the hole and its peripheral portion of the gas diffusion layer of Embodiment 5.

In the example shown in FIG. 12D, the opening portion of the hole 16 has a circular shape, and the outer edge of the hydrophilic portion 15 formed around the opening portion of the hole 16 has a rectangular shape.

Figure 12E:
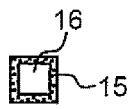
FIG. 12E is an enlarged plan view showing one example of the hole and its peripheral portion of the gas diffusion layer of Embodiment 5.

In the example shown in FIG. 12E, the opening portion of the hole 16 has a rectangular shape, and the outer edge of the hydrophilic portion 15 formed around the opening portion of the hole 16 has a rectangular shape.

Figure 12F:
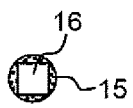
FIG. 12F is an enlarged plan view showing one example of the hole and its peripheral portion of the gas diffusion layer of Embodiment 5.

In the example shown in FIG. 12F, the opening portion of the hole 16 has a rectangular shape, and the outer edge of the hydrophilic portion 15 formed around the opening portion of the hole 16 has a circular shape.

In a case where the inner portions of the holes are hydrophilized simultaneously with the formation of the holes by using a heat source, such as electrical discharge machining, an electron beam, or a laser, for example, the configurations shown in FIGS. 12A to 12C can be adopted.

In Embodiment 5, the polymeric resin may be fluorocarbon resin, and the content of fluorine in the peripheral portion of the hole may be lower than that of the other portion. For example, in a case where the inner portions of the holes are hydrophilized simultaneously with the formation of the holes by using a heat source, such as electrical discharge machining, an electron beam, or a laser, the content of the fluorine in the peripheral portion of the hole becomes lower than that of the other portion.

In Embodiment 5, the holes may be formed so as to penetrate the fuel cell gas diffusion layer, and each of the holes may have such a shape that both ends thereof are large in diameter, and a middle portion thereof is narrow. For example, in a case where the inner portions of the holes are hydrophilized simultaneously with the formation of the holes by using a heat source, such as electrical discharge machining, an electron beam, or a laser, each of the holes is formed such that both ends thereof are large in diameter, and a middle portion thereof is narrow.

FIGS. 13A to 13F are enlarged cross-sectional views each showing the hole and its peripheral portion of the gas diffusion layer of Embodiment 5. In the examples shown in FIGS. 13A to 13F, the hole 16 penetrates the first layer 10 and the second layer 14, and regarding the diameter of the hole 16, the diameter of the opening portion located at the second layer 14 side is larger than that of the opening portion located at the first layer 10 side. In addition, a middle portion of the hole 16 is smaller in diameter than each of both ends of the hole 16. By forming the hole 16 such that the opening portion located at the first layer 10 side facing the gas channel becomes smaller than the opening portion located at the second layer 14 side, the drying of the catalyst layer and the polymer electrolyte membrane can be further reduced while improving the drainage property. In addition, by forming the hole 16 such that the diameter of the middle portion of the hole becomes small, the drying of the catalyst layer and the polymer electrolyte membrane can be further reduced.

Figure 13A:
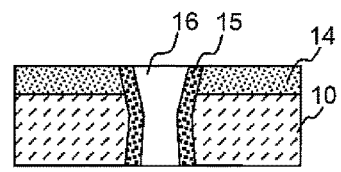
FIG. 13A is an enlarged cross-sectional view showing one example of the hole and its peripheral portion of the gas diffusion layer of Embodiment 5.

In the example shown in FIG. 13A, the hydrophilic portion 15 is formed in the hole 16, and the thickness of the hydrophilic portion 15 is constant.

Figure 13B:
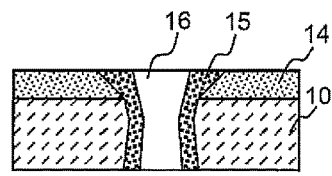
FIG. 13B is an enlarged cross-sectional view showing one example of the hole and its peripheral portion of the gas diffusion layer of Embodiment 5.

In the example shown in FIG. 13B, the hydrophilic portion 15 is formed in the hole 16 and at an opening portion of the hole 16, the opening portion being located at the second layer 14 side. The thickness of the hydrophilic portion 15 at the opening portion located at the second layer 14 side is larger than that of the other portion of the hydrophilic portion 15.

Figure 13C:
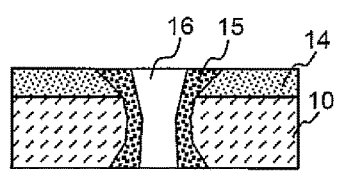
FIG. 13C is an enlarged cross-sectional view showing one example of the hole and its peripheral portion of the gas diffusion layer of Embodiment 5.

In the example shown in FIG. 13C, the hydrophilic portion 15 is formed in the hole 16 and at the opening portion of the hole 16 located at the second layer 14 side and an opening portion of the hole 16 located at the first layer 10 side. The thickness of the hydrophilic portion 15 at each of the opening portion located at the second layer 14 side and the opening portion located at the first layer 10 side is larger than that of the other portion of the hydrophilic portion 15.

Figure 13D:
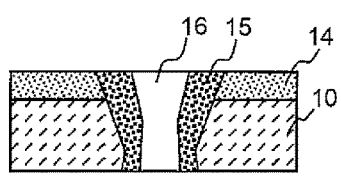
FIG. 13D is an enlarged cross-sectional view showing one example of the hole and its peripheral portion of the gas diffusion layer of Embodiment 5.

In the example shown in FIG. 13D, the hydrophilic portion 15 is formed in the hole 16, and the thickness of the hydrophilic portion 15 gradually increases from the opening portion located at the first layer 10 side toward the opening portion located at the second layer 14 side.

Figure 13E:
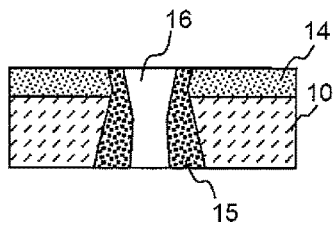
FIG. 13E is an enlarged cross-sectional view showing one example of the hole and its peripheral portion of the gas diffusion layer of Embodiment 5.

In the example shown in FIG. 13E, the hydrophilic portion 15 is formed in the hole 16, and the thickness of the hydrophilic portion 15 gradually decreases from the opening portion located at the first layer 10 side toward the opening portion located at the second layer 14 side.

Figure 13F:
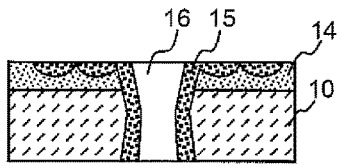
FIG. 13F is an enlarged cross-sectional view showing one example of the hole and its peripheral portion of the gas diffusion layer of Embodiment 5.

In the example shown in FIG. 13F, the hydrophilic portion 15 is formed in the hole 16 and at the opening portion of the hole 16 and its peripheral portion located at the second layer 14 side. According to this configuration, the water (mist) efficiently moves to the hole 16 from the inside of the catalyst layer arranged so as to contact the second layer 14 and the inside of the second layer 14, so that the drainage property improves.

FIGS. 14A to 14F are enlarged cross-sectional views each showing the hole and its peripheral portion of the gas diffusion layer of Embodiment 5. In the examples shown in FIGS. 14A to 14F, the hole 16 penetrates the first layer 10 and the second layer 14, and the diameter of the hole 16 gradually increases from the opening portion located at the first layer 10 side toward the opening portion located at the second layer 14 side. By forming the hole 16 such that the opening portion located at the first layer 10 side facing the gas channel becomes smaller than the opening portion located at the second layer 14 side, the drying of the catalyst layer and the polymer electrolyte membrane can be further reduced while improving the drainage property.

Figure 14A:
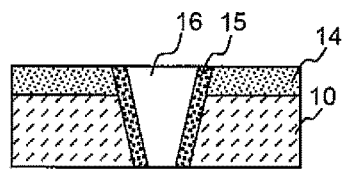
FIG. 14A is an enlarged cross-sectional view showing one example of the hole and its peripheral portion of the gas diffusion layer of Embodiment 5.

In the example shown in FIG. 14A, the hydrophilic portion 15 is formed in the hole 16, and the thickness of the hydrophilic portion 15 is constant.

Figure 14B:
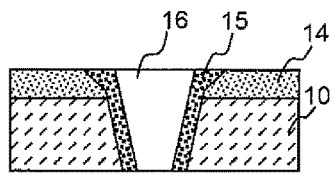
FIG. 14B is an enlarged cross-sectional view showing one example of the hole and its peripheral portion of the gas diffusion layer of Embodiment 5.

In the example shown in FIG. 14B, the hydrophilic portion 15 is formed in the hole 16 and at an opening portion of the hole 16, the opening portion being located at the second layer 14 side. The thickness of the hydrophilic portion 15 at the opening portion located at the second layer 14 side is larger than that of the other portion of the hydrophilic portion 15.

Figure 14C:
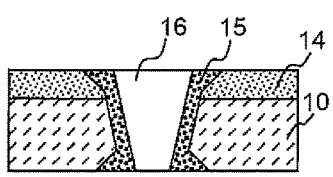
FIG. 14C is an enlarged cross-sectional view showing one example of the hole and its peripheral portion of the gas diffusion layer of Embodiment 5.

In the example shown in FIG. 14C, the hydrophilic portion 15 is formed in the hole 16 and at the opening portion of the hole 16 located at the second layer 14 side and an opening portion of the hole 16 located at the first layer 10 side. The thickness of the hydrophilic portion 15 at each of the opening portion located at the second layer 14 side and the opening portion located at the first layer 10 side is larger than that of the other portion of the hydrophilic portion 15.

Figure 14D:
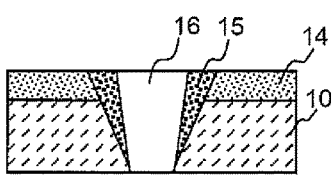
FIG. 14D is an enlarged cross-sectional view showing one example of the hole and its peripheral portion of the gas diffusion layer of Embodiment 5.

In the example shown in FIG. 14D, the hydrophilic portion 15 is formed in the hole 16, and the thickness of the hydrophilic portion 15 gradually increases from the opening portion located at the first layer 10 side toward the opening portion located at the second layer 14 side.

Figure 14E:
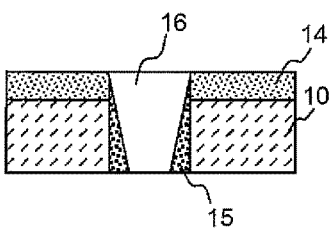
FIG. 14E is an enlarged cross-sectional view showing one example of the hole and its peripheral portion of the gas diffusion layer of Embodiment 5.

In the example shown in FIG. 14E, the hydrophilic portion 15 is formed in the hole 16, and the thickness of the hydrophilic portion 15 gradually decreases from the opening portion located at the first layer 10 side toward the opening portion located at the second layer 14 side.

Figure 14F:
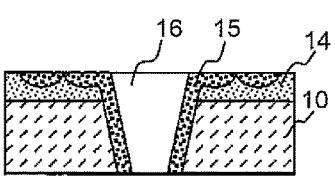
FIG. 14F is an enlarged cross-sectional view showing one example of the hole and its peripheral portion of the gas diffusion layer of Embodiment 5.

In the example shown in FIG. 14F, the hydrophilic portion 15 is formed in the hole 16 and at the opening portion and its peripheral portion located at the second layer 14 side. According to this configuration, the water (mist) efficiently moves to the hole 16 from the inside of the catalyst layer arranged so as to contact the second layer 14 and the inside of the second layer 14, so that the drainage property improves.

The gas diffusion layer according to Embodiment 5 may include: the first layer 10 including the porous member containing the electrically-conductive particles and the polymeric resin as the major components; and the second layer 14 including the porous member containing the electrically-conductive particles and the polymeric resin as the major components, formed so as to contact the first layer 10, and having higher water repellency than the first layer 10.

The other configurations of the gas diffusion layer according to Embodiment 5 are the same as those of Embodiment 1 or 2, so that detailed explanations thereof are omitted. The present embodiment may be modified in the same manner as Embodiment 1 or 2.

Figure 15:
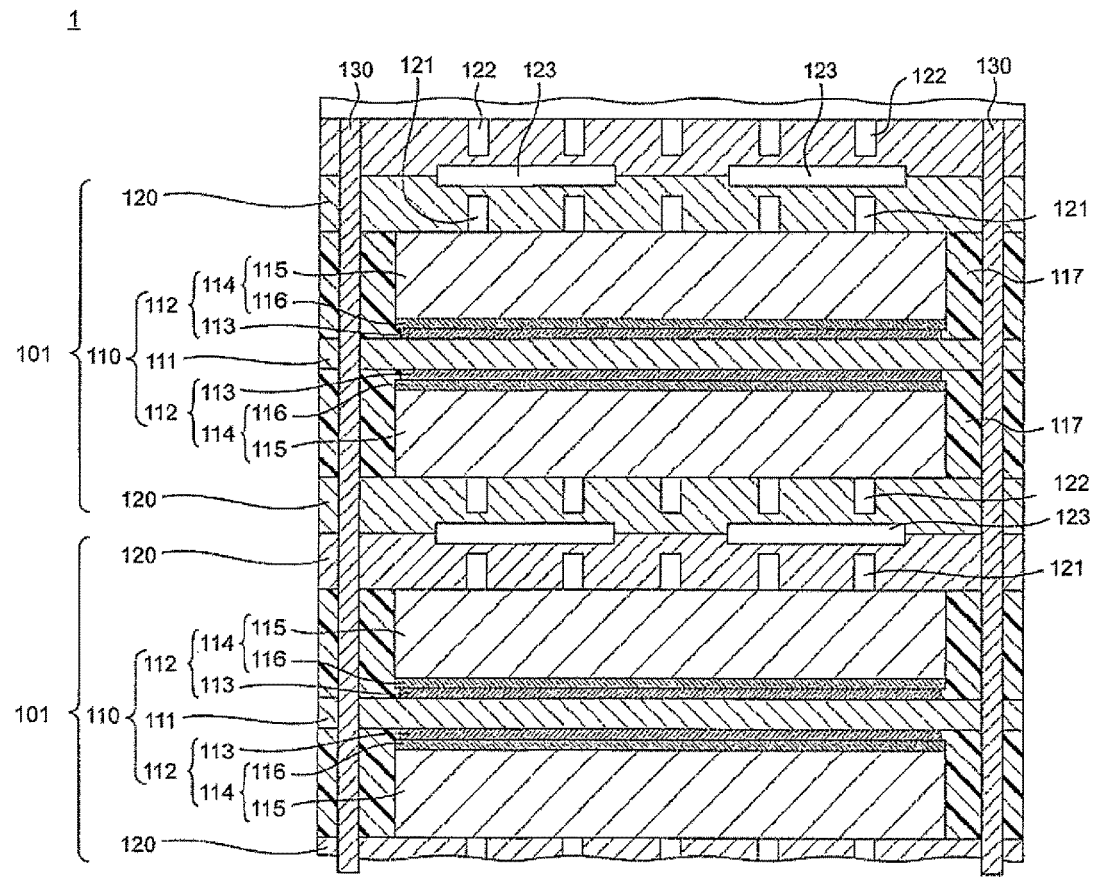
FIG. 15 is a schematic cross-sectional view showing one example of a schematic configuration of a fuel cell according to Embodiment 5.

FIG. 15 is a schematic cross-sectional view showing one example of the schematic configuration of the fuel cell according to Embodiment 5.

In the example shown in FIG. 15, a cell 101 of a fuel cell 1 of the present embodiment includes: a membrane-electrode-gas diffusion layer assembly 110; and a pair of plate-shaped electrically-conductive separators 120 respectively arranged on both surfaces of the membrane-electrode-gas diffusion layer assembly 110.

The membrane-electrode-gas diffusion layer assembly 110 includes: a polymer electrolyte membrane 111 that selectively transports hydrogen ions; and a pair of electrode layers 112 respectively formed on both surfaces of the polymer electrolyte membrane 111. The pair of electrode layers 112 include: catalyst layers 113 respectively formed on both surfaces of the polymer electrolyte membrane 111 and containing carbon powder, which supports platinum group catalysts, as a major component; and gas diffusion layers 114 respectively formed on the catalyst layers 113 and each having a power collection function, gas permeability, and water repellency.

The polymer electrolyte membrane 111 may be a polymer membrane having hydrogen ion conductivity. The shape of the polymer electrolyte membrane 111 is not especially limited, and may be, for example, a substantially rectangular shape. The material of the polymer electrolyte membrane 111 may be a material that selectively moves the hydrogen ions.

Examples of the polymer electrolyte membrane 111 include: fluorinated polymer electrolyte membranes made of perfluoro carbon sulfonic acid (such as Nafion (trademark) produced by DuPont USA, Aciplex (trademark) produced by Asahi Kasei Chemicals Corporation, and Flemion (trademark) produced by Asahi Glass Co., Ltd.); and various hydrocarbon electrolyte membranes.

The catalyst layer 113 may be a layer containing catalysts with respect to an oxidation-reduction reaction of hydrogen or oxygen. The catalyst layer 113 may have electrical conductivity and catalytic activity with respect to the oxidation-reduction reaction of hydrogen and oxygen. The shape of the catalyst layer 113 is not especially limited, but may be, for example, a substantially rectangular shape.

The catalyst layer 113 includes, for example, a porous member containing, as major components, carbon powder that supports platinum group metal catalysts and polymer materials that have proton conductivity. The type of the proton conductive polymer material used in the catalyst layer 113 may be the same as or different from that of the polymer electrolyte membrane.

The gas diffusion layer 114 corresponds to the gas diffusion layer of Embodiment 5. The holes are not shown in FIG. 15. The gas diffusion layer 114 includes a first layer 115 and a second layer 116. The first layer 115 corresponds to the first layer 10 of Embodiment 1 or 2. The second layer 116 corresponds to the second layer 14 of Embodiment 2. The first layer 115 contacts the separator 120. The second layer 116 contacts the catalyst layer 113.

A reactant gas channel may be formed on a main surface of the gas diffusion layer 114, the main surface contacting the separator 120. The gas diffusion layer 114 at the cathode side and the gas diffusion layer 114 at the anode side may be the same as or different from each other.

The separator 120 is, for example, a member that mechanically fixes the membrane-electrode-gas diffusion layer assembly and electrically connects the adjacent membrane-electrode-gas diffusion layer assemblies to each other in series. The separator 120 is made of, for example, a carbon-containing material or a metal-containing material. The separator 120 may be a porous plate having electrical conductivity.

In a case where the separator 120 is made of the carbon-containing material, the separator 120 can be formed in such a manner that: raw material powder prepared by mixing carbon powder and a resin binder is supplied to a mold; and pressure and heat are applied to the raw material powder in the mold.

In a case where the separator 120 is made of the metal-containing material, the separator 120 may be constituted by a metal plate. A gold-plated titanium plate or a gold-plated stainless steel plate can be used as the separator 120.

A fuel gas channel 121 through which the fuel gas flows and an oxidizing gas channel 122 through which the oxidizing gas flows are formed on a main surface (hereinafter referred to as an "electrode surface") of each of the pair of separators 120, the main surface contacting the gas diffusion layer 114. In addition, a cooling water channel 123 through which the cooling water or the like flows is formed on a main surface (hereinafter referred to as a "cooling surface") of each of the pair of separators 120, the main surface not contacting the gas diffusion layer 114. The fuel gas is supplied through the fuel gas channel 121 to the electrode layer 112, and the oxidizing gas is supplied through the oxidizing gas channel 122 to the electrode layer 112. With this, the electrochemical reaction occurs, and the electric power and heat are generated.

The separator 120 has electrical conductivity. During the electric power generation of the fuel cell 11, a current flows in the separator 120 in a direction along a stack direction of the cells 101.

In a case where the reactant gas channel is formed on the gas diffusion layer 114, the fuel gas channel 121 and the oxidizing gas channel 122 do not have to be formed on the separators 120.

Typically, one or more cells 101 are stacked, and the adjacent cells 101 are electrically connected in series to be used. To prevent the leakage of the fuel gas and the oxidizing gas and reduce the contact resistance, the cells 101 stacked on one another are fastened by fastening members 130, such as bolts, at predetermined fastening pressure. Therefore, the membrane-electrode-gas diffusion layer assembly 110 and the separator 120 surface-contact each other at predetermined pressure. To prevent the gas, necessary for the electrochemical reaction, from leaking to the outside, a gasket 117 (seal member) is arranged between the separators 120 so as to cover a side surface of the catalyst layer 113 and a side surface of the gas diffusion layer 114.

The gasket 117 may be a member that fills a gap defined by the catalyst layer 113, the polymer electrolyte membrane 111, and the separator 120 or a gap between the catalyst layer 113 and the separator 120. The gasket may be made of synthetic resin having moderate mechanical strength and flexibility. The shape of the gasket 117 is not especially limited and may be, for example, a ring shape and substantially rectangular shape.

Manufacturing Method

In Embodiment 5, a method of forming the holes is not especially limited. Specifically, the holes may be formed by using a known method, such as etching, a drill, a needle, electrical discharge machining, an electron beam, a laser, or a press.

The method of hydrophilizing the inner portion of the hole is not especially limited. Specifically, for example, a method of applying hydrophilic functional groups to an inner wall surface of the hole can be used. Or, for example, liquid phase oxidation, such as chemical solution oxidation or electrolytic oxidation, may be used. Or, for example, gas-phase oxidation may be used. Or, for example, the hydrophilic functional groups, such as hydroxyl groups, sulfo groups, or carboxy groups, may be applied to the surface of the gas diffusion layer by oxygen, sulfuric anhydride, or the like. Or, for example, the inner portions of the holes may be hydrophilized simultaneously with the formation of the holes by using a heat source, such as electrical discharge machining, an electron beam, or a laser. In this case, the producibility can be further improved.

Figure 16:
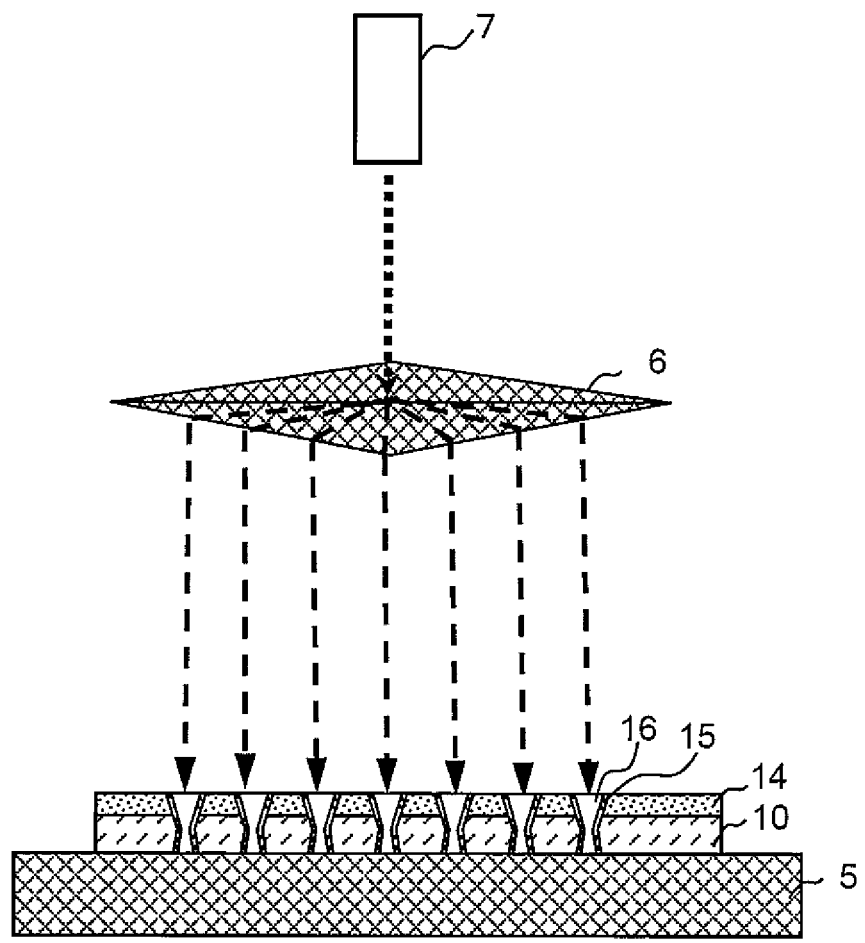
FIG. 16 is a conceptual diagram showing one example of a method of forming the holes and hydrophilizing inner portions of the holes in Embodiment 5.

FIG. 16 is a conceptual diagram showing one example of a method of forming the holes and hydrophilizing the inner portions of the holes in Embodiment 5.

In the example shown in FIG. 16, the laser light emitted from a laser irradiation device 7 toward the surface of the second layer 14 in a direction perpendicular to the surface of the second layer 14 passes through a fθ lens 6 to be displaced by a predetermined distance and be then incident on the surface of the second layer 14 in the direction perpendicular to the surface of the second layer 14. As a result, the laser light penetrates the second layer 14 and the first layer 10. Thus, the holes 16 are formed. The inner portions of the holes 16 are hydrophilized, so that the hydrophilic portions 15 are formed.

The value of an arithmetic mean roughness (Ra) of a surface of a fixing base 5 that holds a target object may be small. By setting the Ra value to a small value, the light that enters through an exit of the target object is less likely to diffuse by reflection. Thus, the shape of the hole can be further made uniform. The Ra value may be set within a range of not less than 0.01 μm and not more than 100 μm. The Ra value may be set within a range of not less than 0.01 μm and less than 10.0 μm.

Other than the above, the method of manufacturing the gas diffusion layer of Embodiment 5 may be the same as that of Embodiment 1 or 2, so that a detailed explanation thereof is omitted.

Photos of Cross Section

A cross section structure in a case where the gas diffusion layer (first layer) was manufactured in the same manner as Example 1 and the holes were formed by using the UV laser (the diameter of the hole was about 120 μm) and a cross section structure in a case where the gas diffusion layer (first layer) was manufactured in the same manner as Example 1 and the holes were formed by using the needle (the diameter of the hole was about 120 μm) were compared to each other. After the holes were formed, the cross sections of the samples were processed by broad ion beam (BIB) using Ar ions. Then, the cross sections were observed with a scanning electron microscope at an accelerating voltage of 3.0 kV. By the broad ion beam processing, a wide region can be flattened without causing thermal damages such that each of projections and depressions on the cross section becomes about 100 μm or less.

Figure 17A:
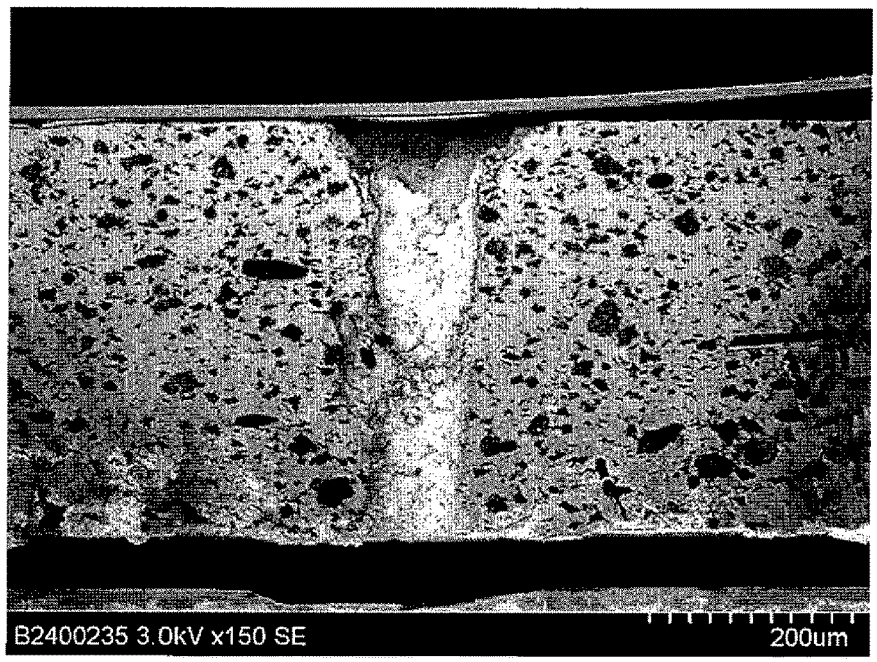
FIG. 17A is a scanning electron micrograph of a cross section of the gas diffusion layer in a case where the hole is formed by using a UV laser.

FIG. 17A is a scanning electron micrograph of the cross section of the gas diffusion layer in a case where the hole is formed by using the UV laser. In FIG. 17A, an upper side is an entrance of the laser light, and a lower side is an exit of the laser light.

As shown in FIG. 17A, in a case where the hole is formed by using the laser, the diameter of the hole at the entrance of the laser light is larger than the diameter of the hole at the exit of the laser light. In addition, the diameter of the middle portion of the hole is smaller than the diameter of each of both ends of the hole. To be specific, the hole has such a shape that the middle portion thereof is narrow.

Figure 17B:
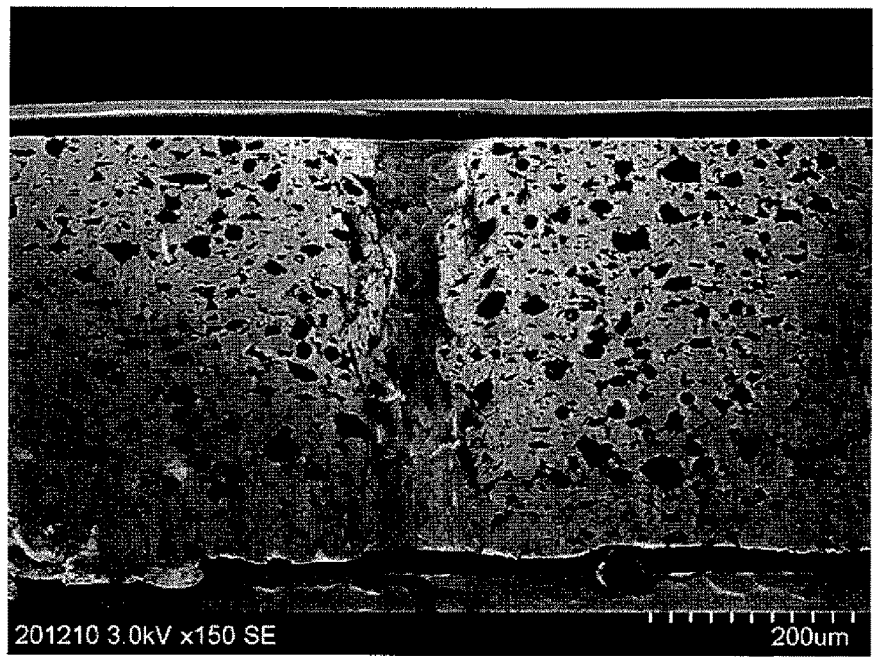
FIG. 17B is a scanning electron micrograph of the cross section of the gas diffusion layer in a case where the hole is formed by using a needle.

FIG. 17B is a scanning electron micrograph of the cross section of the gas diffusion layer in a case where the hole is formed by using the needle. In FIG. 17B, an upper side is an entrance of the needle, and a lower side is an exit of the needle.

As shown in FIG. 17B, in a case when the hole is formed by using the needle, the diameter of the hole at the entrance of the needle is equal to the diameter of the hole at the exit of the needle.

It was concluded that the reason that the diameter of the hole at the entrance of the laser is larger than the diameter of the hole at the exit of the laser in a case where the hole is formed by using the laser is the following mechanism. In the vicinity of the entrance of the laser light, laser light is incident on the surface of the gas diffusion layer in a state where the laser light has an energy substantially equal to an energy at the time of the emission. Thus, a part of the surface of the gas diffusion layer is heated to be volatilized. Therefore, the diameter of the hole at the entrance of the laser light becomes larger than the diameter of the laser light. As the laser light travels in the gas diffusion layer in the thickness direction, the laser light loses its energy. Therefore, the diameter of the hole in the vicinity of the exit of the laser light becomes smaller than the diameter of the hole at the entrance of the laser light. The gas diffusion layer may be arranged such that the entrance of the laser light is located at the catalyst layer side. With this, the drying of the catalyst layer and the polymer electrolyte membrane can be further reduced while improving the drainage property.

It was concluded that the reason that the middle portion of the hole is narrow in a case where the hole is formed by using the laser is the reflection of the laser light at the time of the laser processing. According to this shape of the hole, the entrance and the exit are prevented from being closed by fastening or the like, so that the drying of the catalyst layer and the polymer electrolyte membrane can be further reduced.

Example 6

In Example 6, the membrane-electrode assembly was manufactured in the same manner as Example 1.

In Example 6, the stack body in which the second layer was stacked on the first layer was manufactured in the same manner as Example 2.

The anode gas diffusion layer was formed in such a manner that the holes were formed on the stack body, obtained by the above method, by using the UV laser. The diameter of the hole was about 120 μm. The pitch of the adjacent holes was 1.8 mm. Used as the fixing base was a stainless steel base having heat resistance. The arithmetic mean roughness (Ra) of the surface of the fixing base was 10 to 20 μm. To be specific, regarding the pitch of the holes, the pitch x (the distance from the center of a certain hole to the center of a hole adjacent to the certain hole; the same is true hereinafter) in the direction parallel to the gas channel was 1.8 mm, and the pitch y (in a case where the holes are formed in rows each parallel to the gas channel, a distance between a line passing through the centers of the holes of a certain row and a line passing through the centers of the holes of a row adjacent to the certain row; the same is true hereinafter) in the direction perpendicular to the gas channel was 1.56 mm. The holes were arranged in a zig-zag alignment (rows of the holes were displaced from each other by a half pitch, the rows being adjacent to each other in the direction perpendicular to the gas channel) The shape of the gas diffusion layer was a square of 140 mm*140 mm. The area of the main surface of the gas diffusion layer was 19,600 mm$^2$. The area of one hole was 0.011 mm$^2$. The number of holes was 12,936 (66 holes/cm$^2$). The opening area of the holes was 146 mm$^2$. Therefore, the opening area of the holes in Example 3 was 0.746% of the area of the main surface of the fuel cell gas diffusion layer.

As the cathode gas diffusion layer, the stack body was used without forming the through holes.

49

The other configurations were the same as those of Example 2 of the Embodiment 2. Thus, the membrane-electrode-gas diffusion layer assembly was obtained.

The number of samples of Example 6 was two.

Example 7

In Example 7, the membrane-electrode assembly was manufactured in the same manner as Example 1.

In Example 7, the stack body in which the second layer was stacked on the first layer was manufactured in the same manner as Example 2.

The anode gas diffusion layer was formed in such a manner that the holes were formed on the stack body, obtained by the above method, by using the needle made of the kanthal wire (iron-chromium-aluminium alloy). The diameter of the hole was about 120 μm. The pitch of the adjacent holes was 1.8 mm. To be specific, regarding the pitch of the holes, the pitch x (the distance from the center of a certain hole to the center of a hole adjacent to the certain hole; the same is true hereinafter) in the direction parallel to the gas channel was 1.8 mm, and the pitch y (in a case where the holes are formed in rows each parallel to the gas channel, a distance between a line passing through the centers of the holes of a certain row and a line passing through the centers of the holes of a row adjacent to the certain row; the same is true hereinafter) in the direction perpendicular to the gas channel was 1.56 mm. The holes were arranged in a zig-zag alignment (rows of the holes were displaced from each other by a half pitch, the rows being adjacent to each other in the direction perpendicular to the gas channel) The shape of the gas diffusion layer was a square of 140 mm*140 mm. The area of the main surface of the gas diffusion layer was 19,600 $mm^2$. The area of one hole was 0.011 $mm^2$. The number of holes was 12,936 (66 holes/$cm^2$). The opening area of the holes was 146 $mm^2$. Therefore, the opening area of the holes in Example 3 was 0.746% of the area of the main surface of the fuel cell gas diffusion layer.

As the cathode gas diffusion layer, the stack body was used without forming the through holes.

The other configurations were the same as those of Example 2 of Embodiment 2. Thus, the membrane-electrode-gas diffusion layer assembly was obtained.

The number of samples in Example 7 was two.

Comparative Example 3

Comparative Example 3 of Embodiment 5 was the same in configuration as Comparative Example 3 of Embodiment 2.

The number of samples in Comparative Example 3 was two.

Profile of Content of Fluorine

Regarding Example 6, Example 7, and Comparative Example 3, a concentration profile of fluorine on the surface of the second layer was obtained under the following conditions by using an EPMA (Electron Probe X-ray Micro Analyzer) form the second layer side. The accelerating voltage was 15 kV. The irradiation current was about 5.0*$10^{-8}$ A. The scanning area was 0.8 mm*1.0 mm FIG. 18 is a diagram showing one example of the concentration profile of the fluorine on the surface in each of Example 6 (Laser), Example 7 (Needle), and Comparative Example 3 (Ref.).

Figure 18:
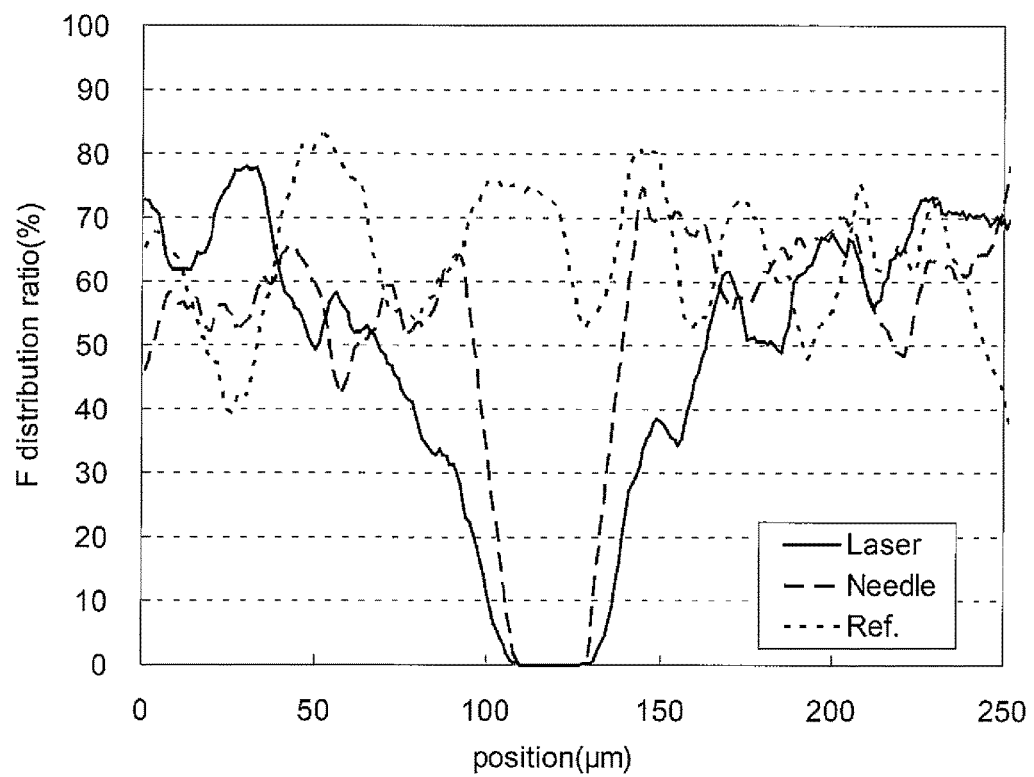
FIG. 18 is a diagram showing one example of a concentration profile of fluorine on a surface in each of Example 6 (Laser), Example 7 (Needle), and Comparative Example 3 (Ref.).

As shown in FIG. 18, the concentration of the fluorine in the peripheral portion of the hole in Example 6 is lower than that in Example 7. This may be because in Example 6, the fluorine was volatilized at the peripheral portion of the irradiated portion at the time of the laser irradiation.

50

Electric Power Generation Test

The fuel cells respectively including the membrane-electrode-gas diffusion layer assemblies of Example 6, Example 7, and Comparative Example 3 were manufactured. Each of unit cells was manufactured such that: the membrane-electrode-gas diffusion layer assembly was sandwiched between the separator including the gas channel for fuel gas supply and the cooling water channel and the separator including the gas channel for oxidizing gas supply; gaskets made of fluorocarbon rubber were respectively arranged around the cathode and the anode to be located between the separators; and the area of the effective electrode (the anode or the cathode) was 196 $cm^2$.

The temperature of each of the unit cells of Example 1, Comparative Example 1, and Comparative Example 2 was maintained at 65° C. The mixture gas of the hydrogen gas and carbon dioxide (75% of the mixture gas was the hydrogen gas, and 25% of the mixture gas was the carbon dioxide) was supplied as the fuel gas to the anode-side gas channel, and air was supplied to the cathode-side gas channel. The hydrogen gas utilization ratio was 80%, and the air utilization ratio was 45%. After each of the fuel gas and the air was humidified such that the dew point thereof became about 65° C., the fuel gas and the air were supplied to the unit cell.

First, the aging (activation treatment) of each of the unit cells was performed in such a manner that the unit cell was caused to generate electric power for 12 hours at a current density of 0.24 A/$cm^2$.

After that, room temperature start-up was performed as below. First, the electric power generation of each of the unit cells was stopped, and the temperatures of the unit cells were decreased to room temperature (about 25° C.). After that, the dew point of the fuel gas was set to about 65° C., and the fuel gas was then supplied to the anode. The air was not humidified, and the dry air (having a dew point of −45° C.) was supplied to the cathode. Then, the electric power generation of each unit cell was started up at a current density of 0.24 A/$cm^2$. Further, after the electric power generation was started, the temperature of the unit cell was increased up to 65° C. This process is called room temperature start-up since the temperature of the unit cell at the time of the start of the electric power generation was room temperature. After four hours from the start of the electric power generation, the voltages (after-four-hour voltages) of the unit cells were measured. Further, after the electric power generation was continuously performed for about 1,000 hours, the electric power generation test was terminated. Then, the fuel cells were disassembled, and the number of portions at each of which the cathode-side gas diffusion layer was separated from the catalyst layer was confirmed. The portion at which the cathode-side gas diffusion layer was separated from the catalyst layer denotes a portion where the gas diffusion layer slightly floated from the catalyst layer. In each of these samples, the portion at which the gas diffusion layer was separated from the catalyst layer was not found at the anode side.

Results of the electric power generation test are shown in Table 5.

TABLE 5

| Samples | Formation of Holes | Difference between After-four-hour Voltages | Number of Separated Portions |
|---|---|---|---|
| Example 6 | Laser | +4.0-+5.0 | Zero |
| Example 7 | Needle | 0.0 | Zero |
| Comparative Example 3 | None | 0.0 | Many |

As shown in Table 4, the after-four-hour voltage of each of the samples of Example 6 was higher than that of Example 7 by 4 to 5 mV. It was confirmed that the electric power generation efficiency of Example 6 in which the holes were formed by the laser was higher than that of Example 7 in which the holes were formed by the needle. The after-four-hour voltage of Comparative Example 3 was substantially the same as that of Example 7.

It was confirmed that the number of separated portions in each of Examples 6 and 7 was zero, but the number of separated portions in Comparative Example 3 was large. It was confirmed that the possibility of the occurrence of the deformation and separation of the gas diffusion layer can be reduced in each of Example 6 in which the holes were formed by the laser and Example 7 in which the holes were formed by the needle.

From the foregoing explanation, many modifications and other embodiments of the present invention are apparent to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

The fuel cell gas diffusion layer of the present invention is useful as a fuel cell gas diffusion layer capable of further improving the electric power generation performance of the fuel cell in a case where the gas diffusion layer including the porous member containing the electrically-conductive particles and the polymeric resin as the major components is used in the fuel cell.

REFERENCE SIGNS LIST 1 fuel cell
5 fixing base
6 fθ lens
7 laser irradiation device
10 first layer
12 hole
14 second layer
16 hole
17 hole
18 cathode catalyst layer
20 polymer electrolyte membrane
22 anode catalyst layer
24 layer
26 layer
30 gas channel
100 gas diffusion layer
101 cell
110 membrane-electrode-gas diffusion layer assembly
111 polymer electrolyte membrane
112 electrode layer
113 catalyst layer
114 gas diffusion layer
115 first layer
116 second layer
117 gasket
120 separator
121 fuel gas channel
122 oxidizing gas channel
123 cooling water channel
200 gas diffusion layer
250 gas diffusion layer
300 gas diffusion layer

The invention claimed is:

1. A fuel cell gas diffusion layer having a first main surface and a second main surface opposite to the first main surface, the fuel cell gas diffusion layer comprising:
a first layer including a first porous member containing first electrically-conductive particles and first polymeric resin as major components, the first layer having the first main surface and a first opposite surface opposite to the first main surface; and
a second layer including a second porous member containing electrically-conductive particles and second polymeric resin as major components, and having higher water repellency than the first layer, the second layer having the second main surface and a second opposite surface, opposite to the second main surface and in contact with the first opposite surface of the first layer,
wherein a plurality of holes extending from the first main surface to the second main surface of the fuel cell gas diffusion layer are formed so as to pass through the first opposite surface of the first layer and the second opposite surface of the second layer,
the first layer has water repellency, and
each of the first porous member and the second porous member does not contain carbon fiber as a base material and has a self-supporting body structure constituted only by the electrically-conductive particles and the polymeric resin.

2. The fuel cell gas diffusion layer according to claim 1, wherein an opening area of the holes is not less than 0.1% and not more than 1.2% of an area of the first main surface of the fuel cell gas diffusion layer.

3. The fuel cell gas diffusion layer according to claim 1, wherein an opening area of the holes is not less than 0.3% and not more than 1.1% of an area of the first main surface of the fuel cell gas diffusion layer.

4. The fuel cell gas diffusion layer according to claim 1, wherein an opening area of the holes is not less than 0.5% and not more than 1.0% of an area of the first main surface of the fuel cell gas diffusion layer.

* * * * *